Nov. 14, 1939.  O. E. WOLFF  2,179,535
MACHINE FOR HANDLING SHEET MATERIAL
Filed March 11, 1938  20 Sheets-Sheet 1
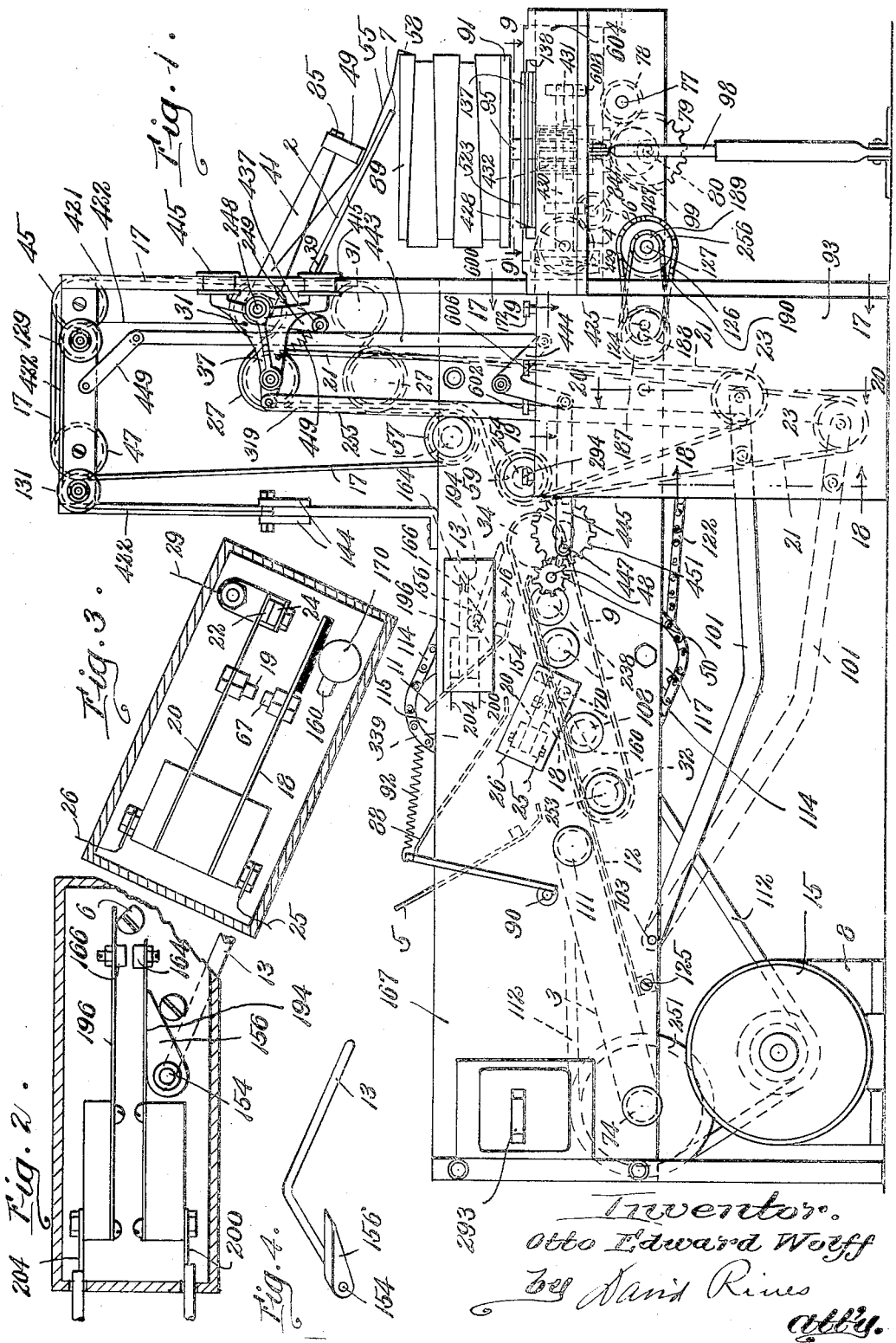
Inventor.
Otto Edward Wolff
by David Rines
atty.

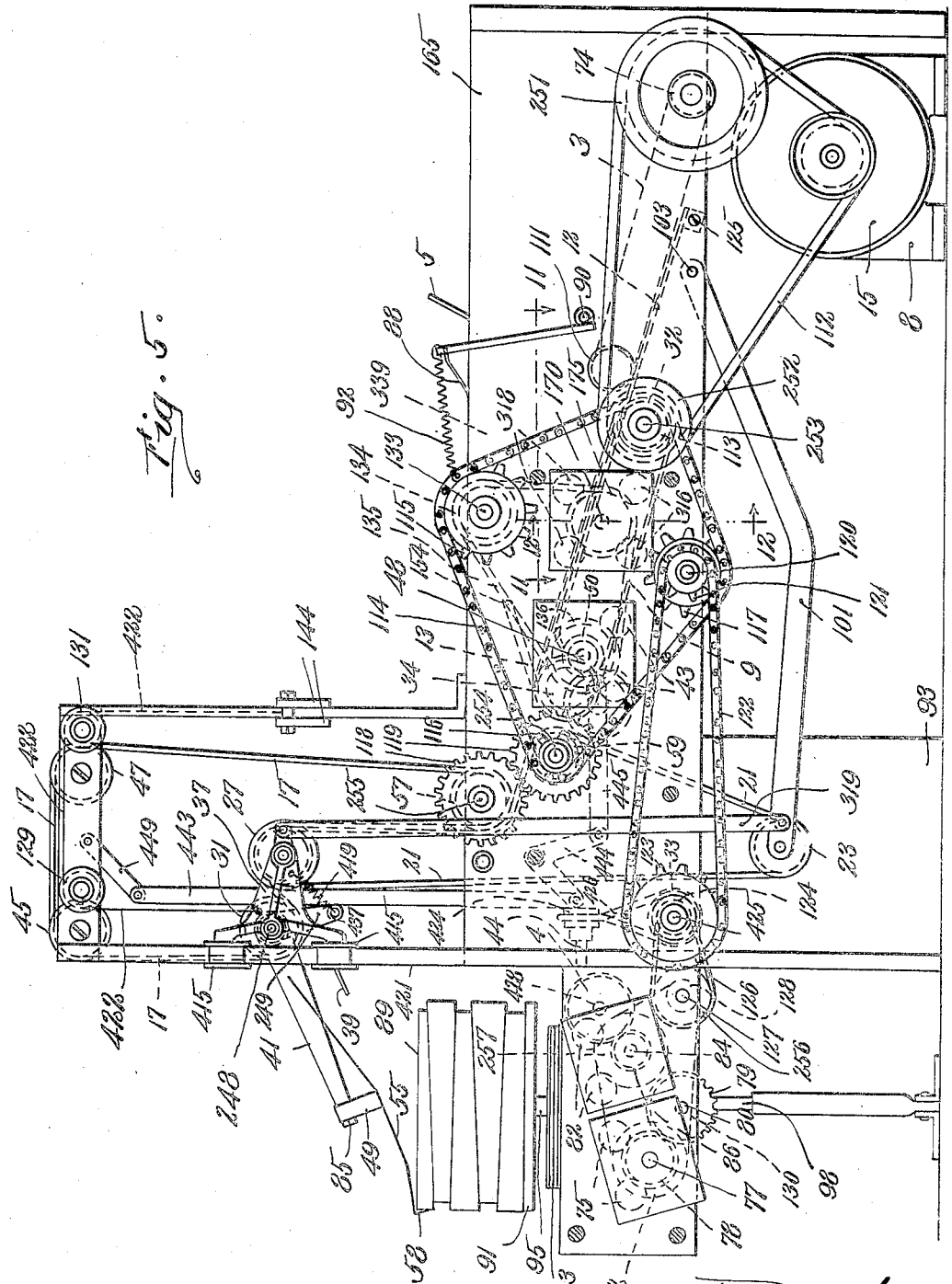

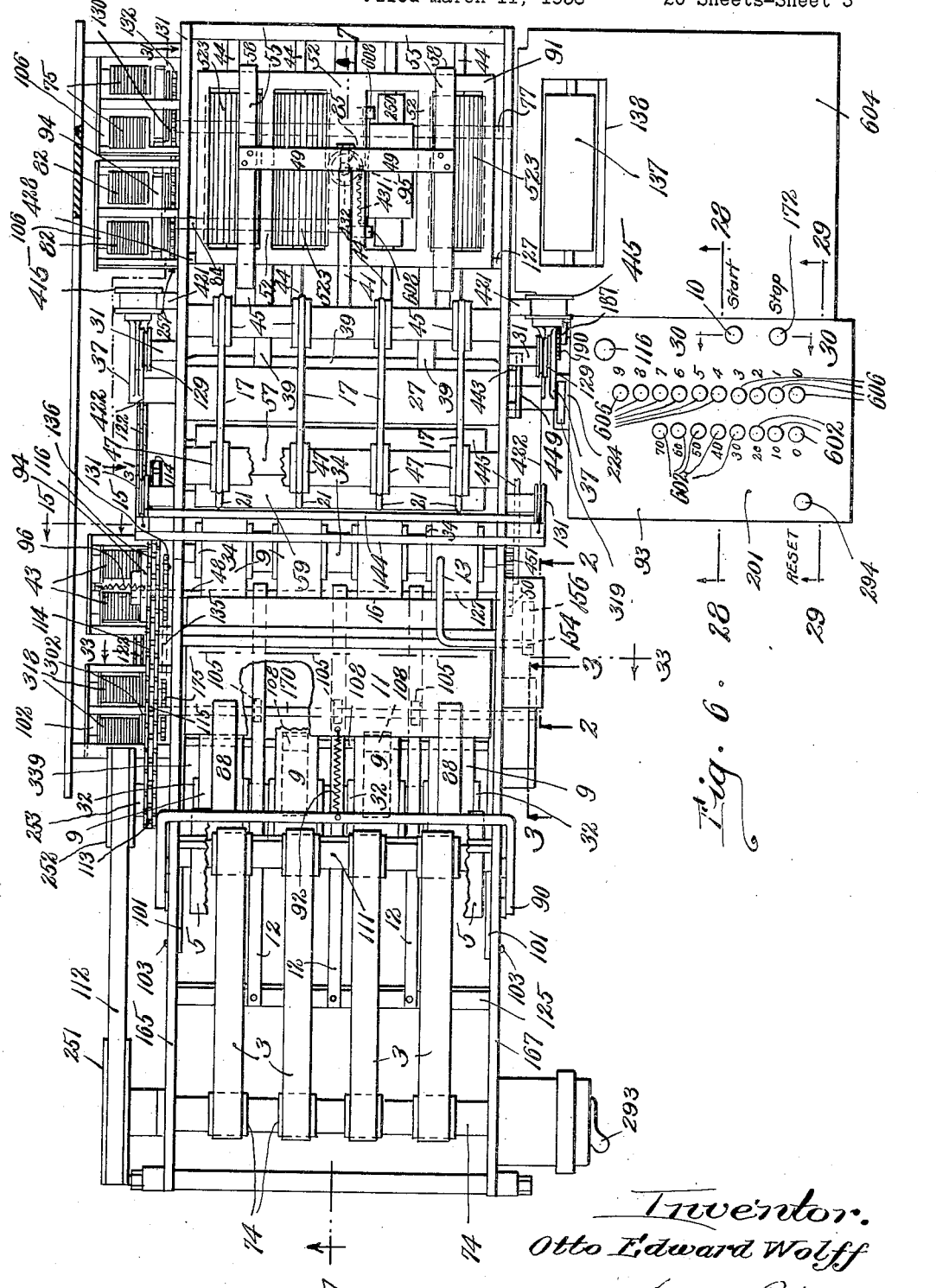

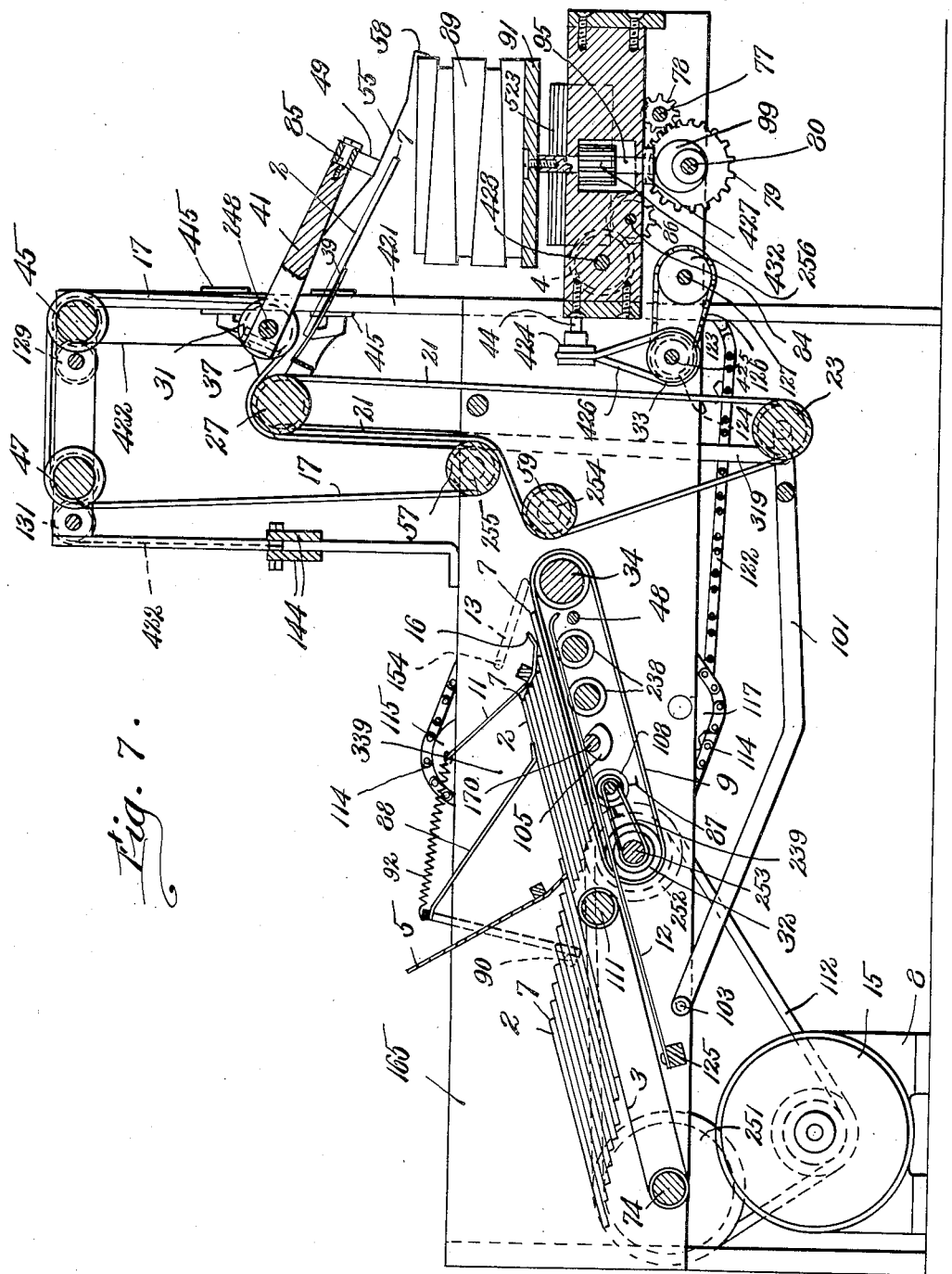

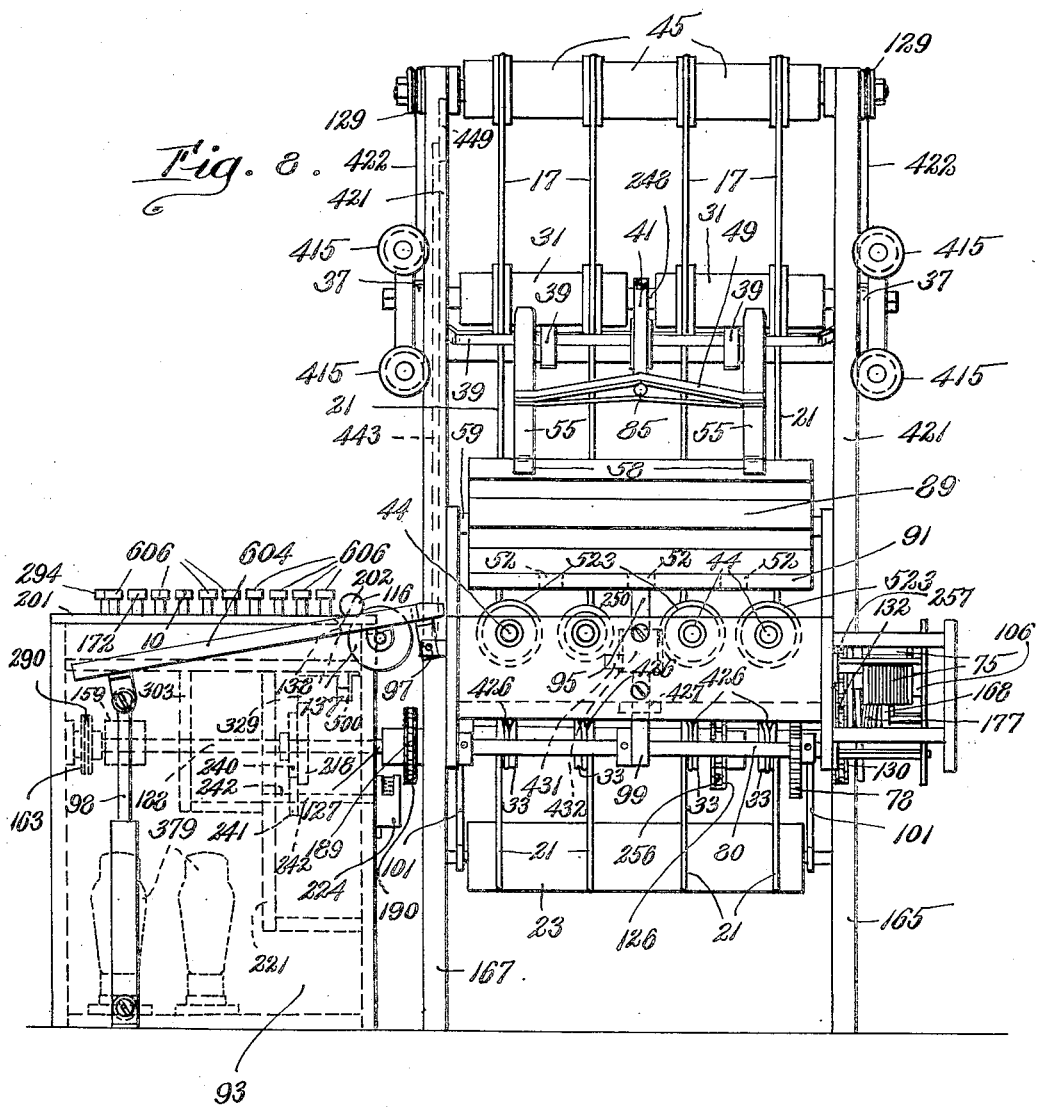

Nov. 14, 1939.  O. E. WOLFF  2,179,535

MACHINE FOR HANDLING SHEET MATERIAL

Filed March 11, 1938  20 Sheets-Sheet 6

Inventor.
Otto Edward Wolff
by David Rines
atty.

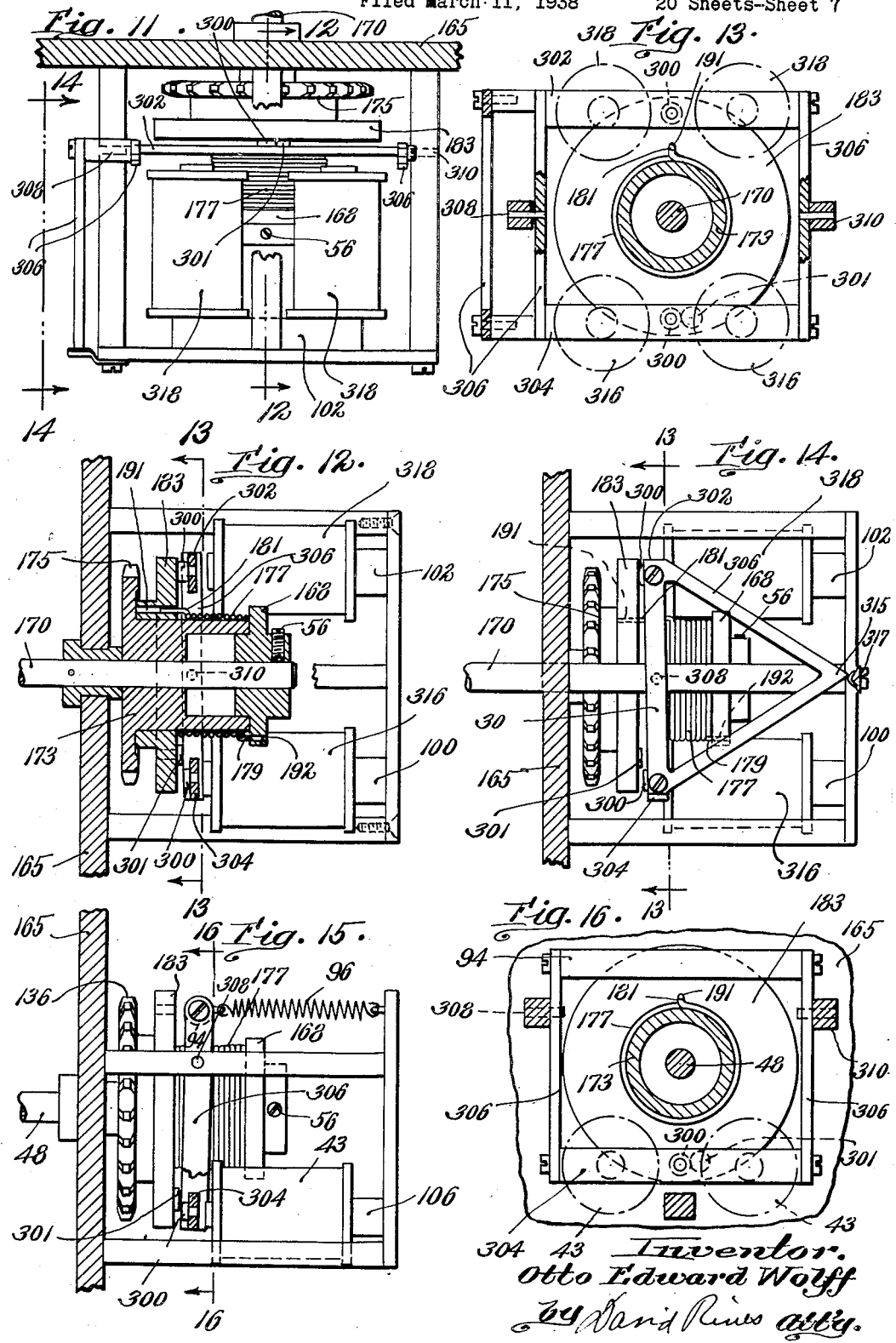

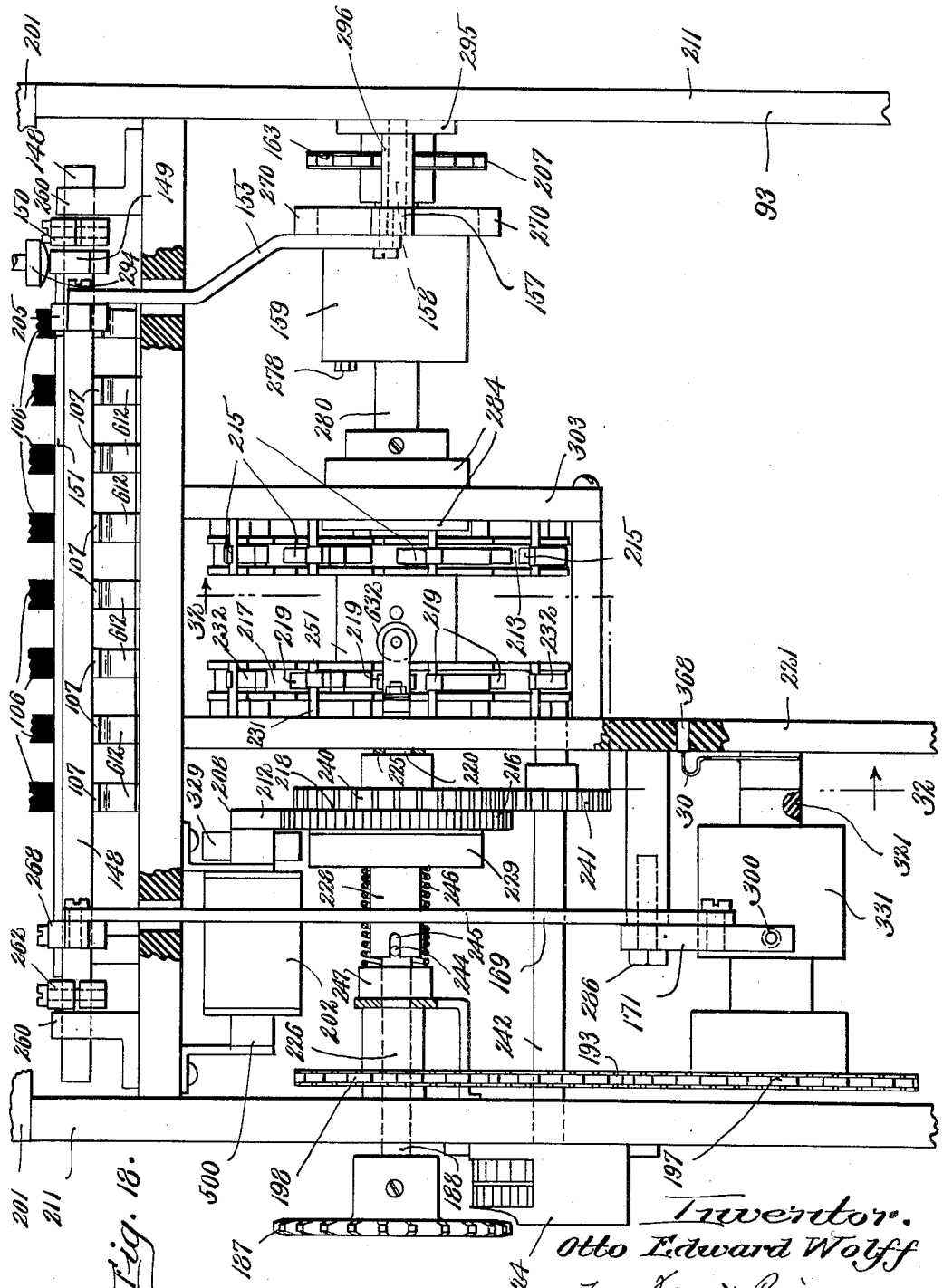

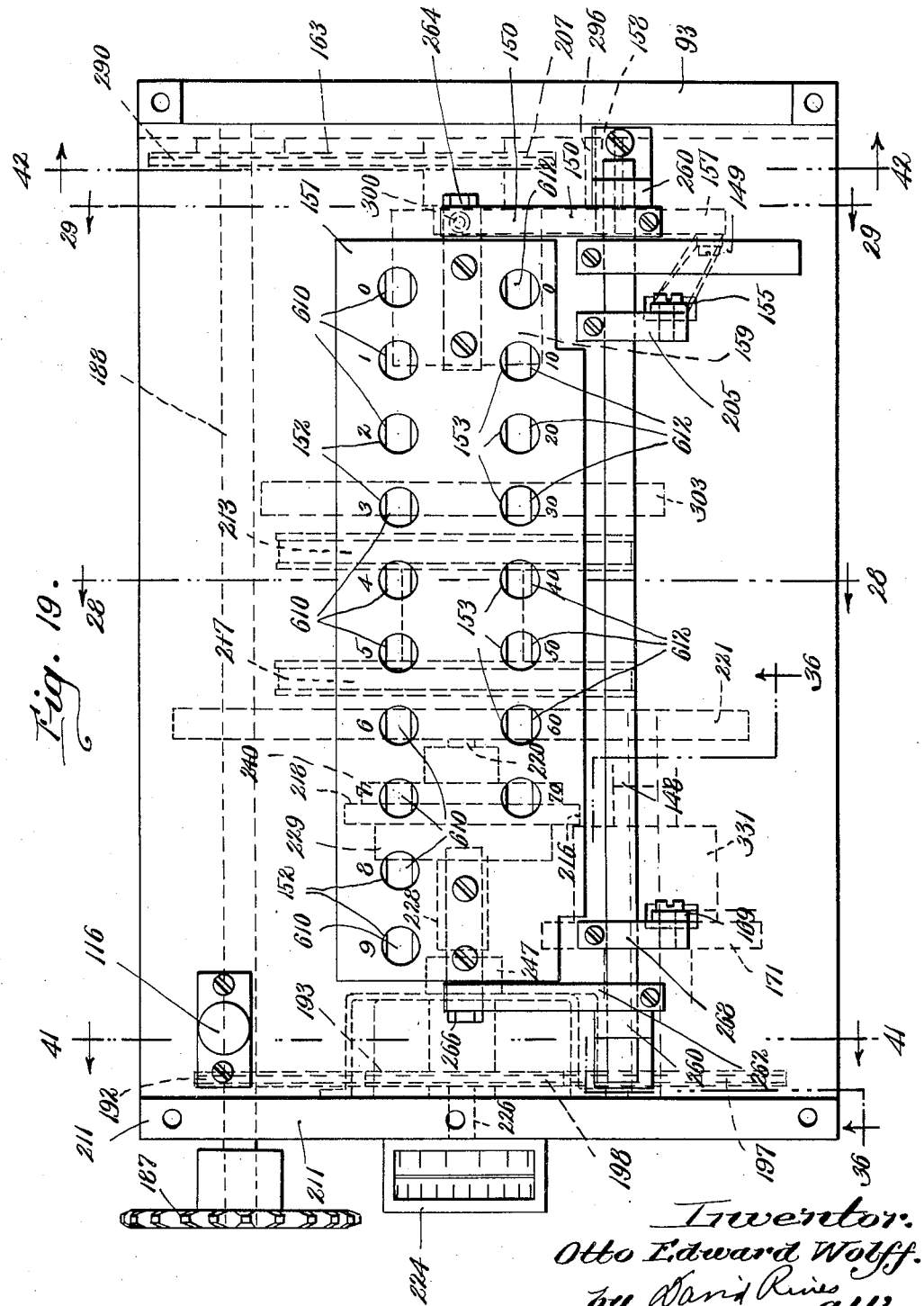

Nov. 14, 1939.   O. E. WOLFF   2,179,535
MACHINE FOR HANDLING SHEET MATERIAL
Filed March 11, 1938   20 Sheets-Sheet 11
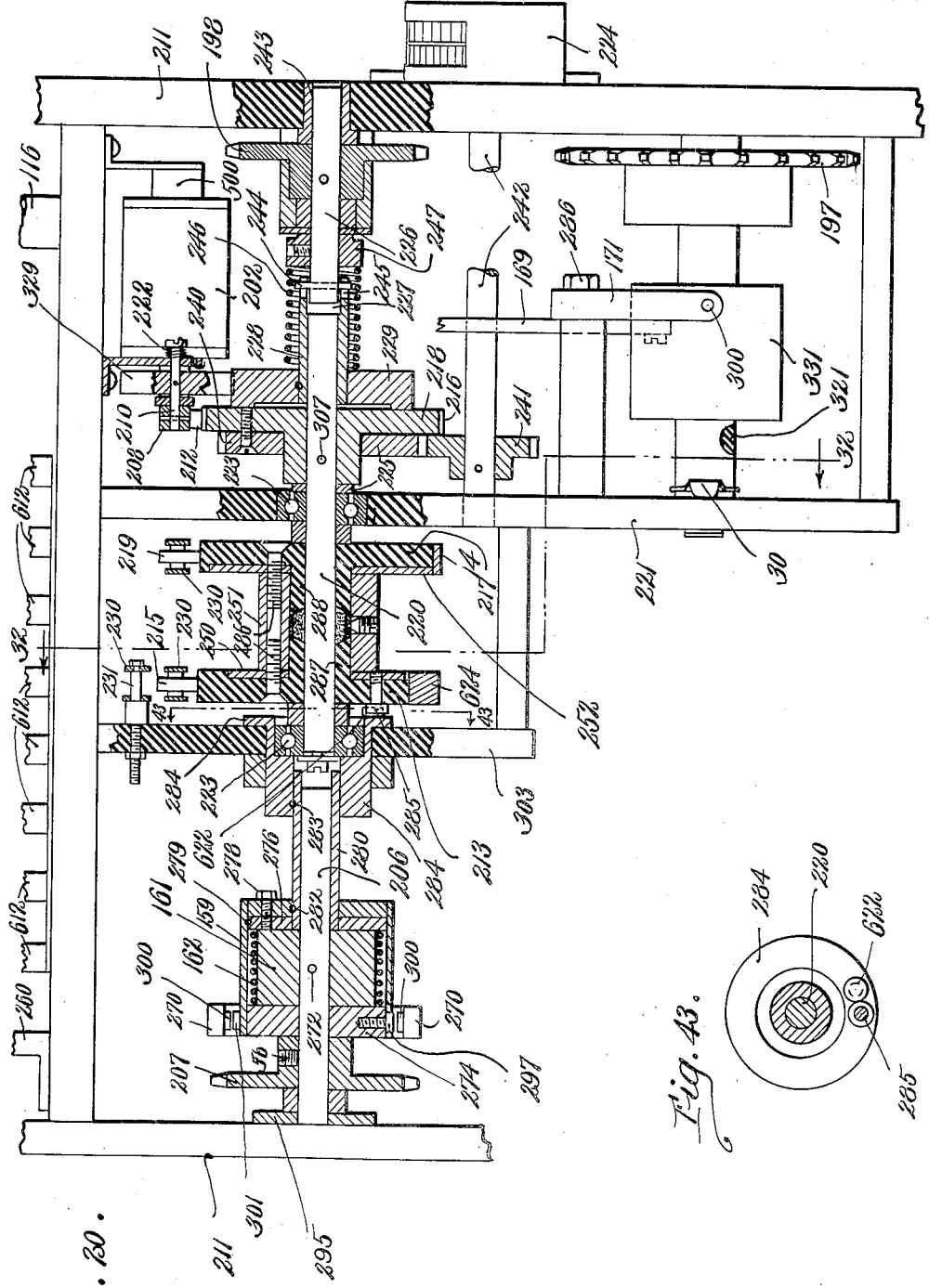
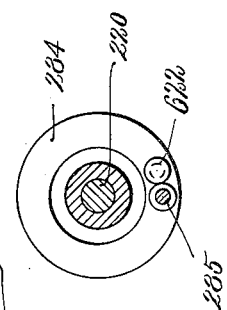
Inventor.
Otto Edward Wolff
by David Ruies
Atty.

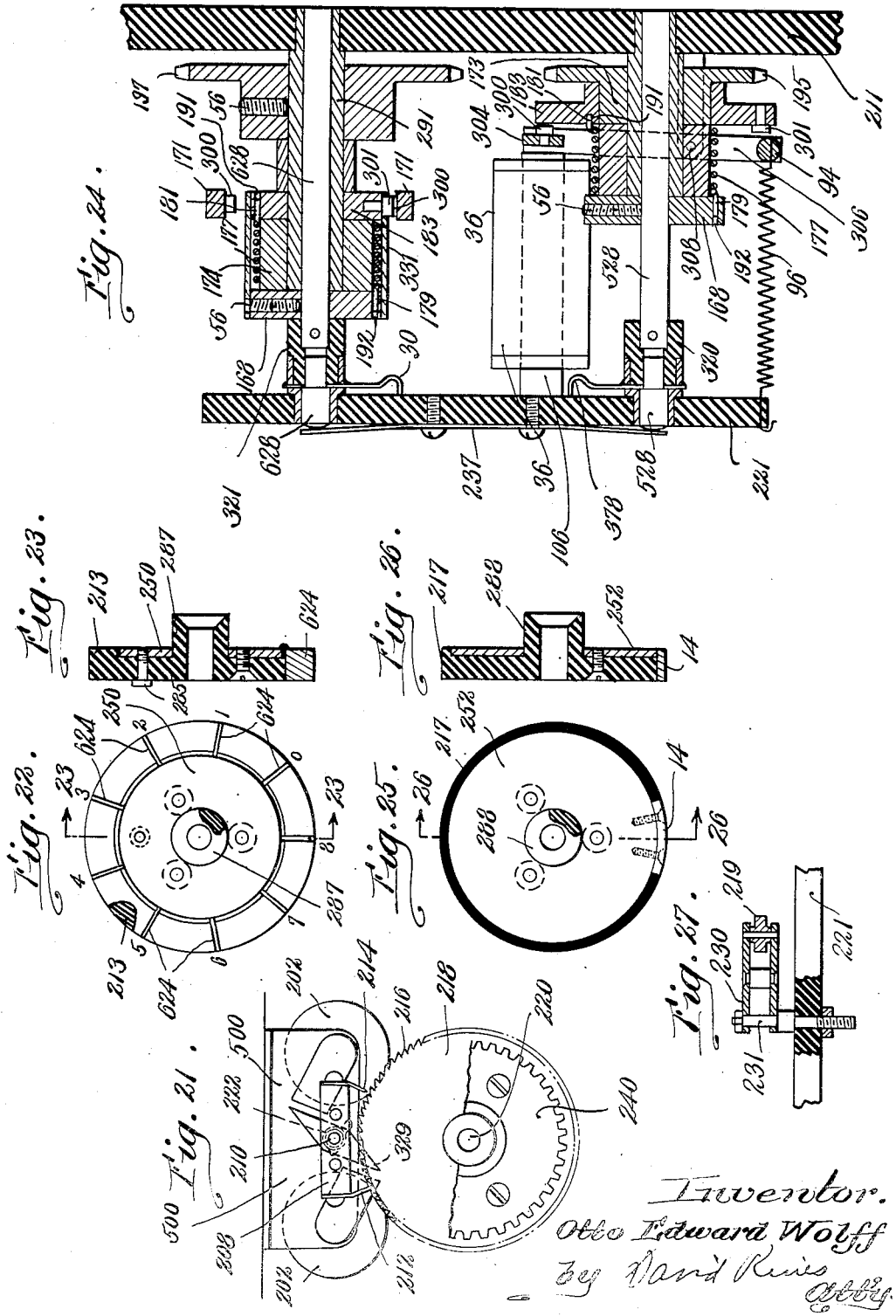

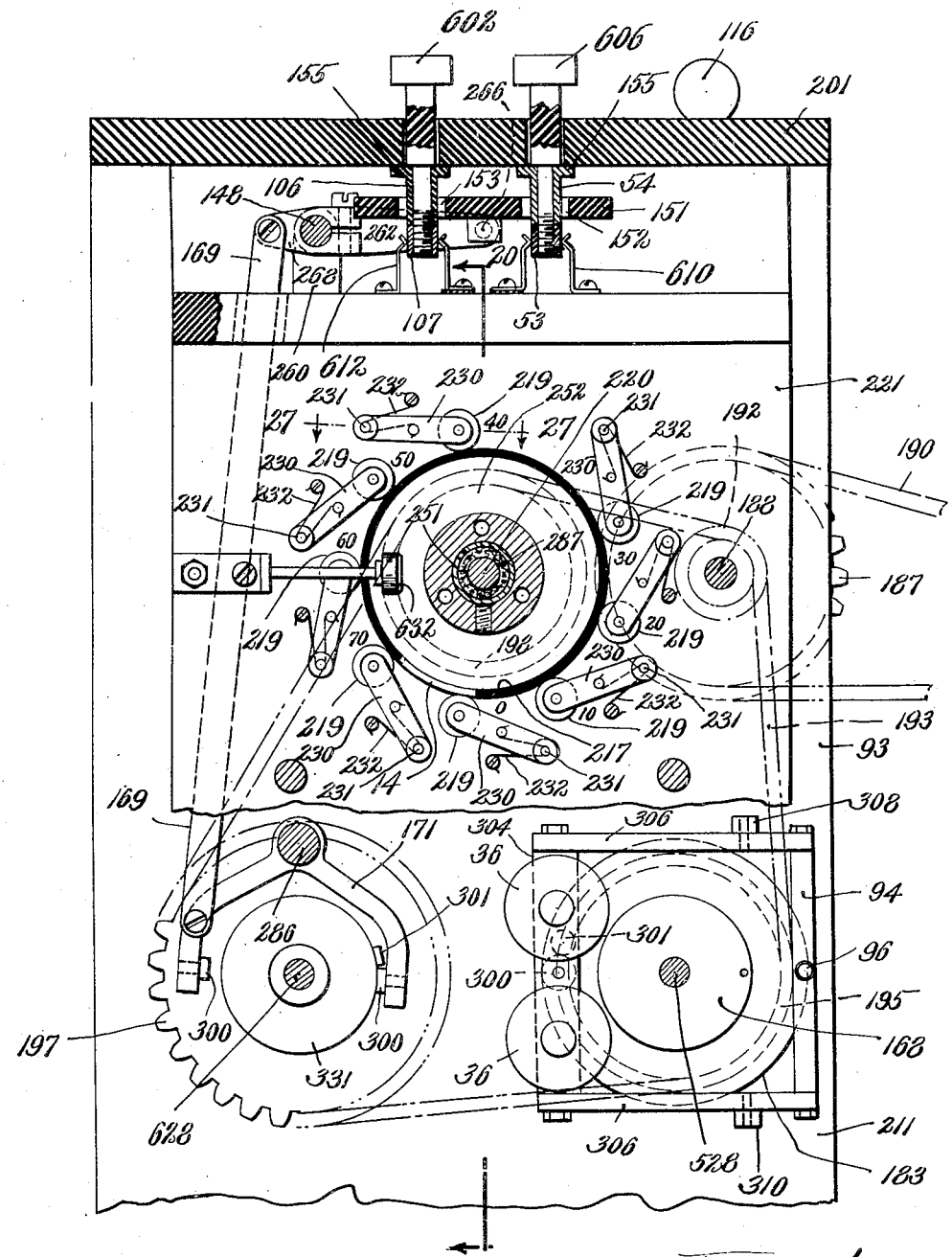

Nov. 14, 1939.  O. E. WOLFF  2,179,535
MACHINE FOR HANDLING SHEET MATERIAL
Filed March 11, 1938  20 Sheets-Sheet 14
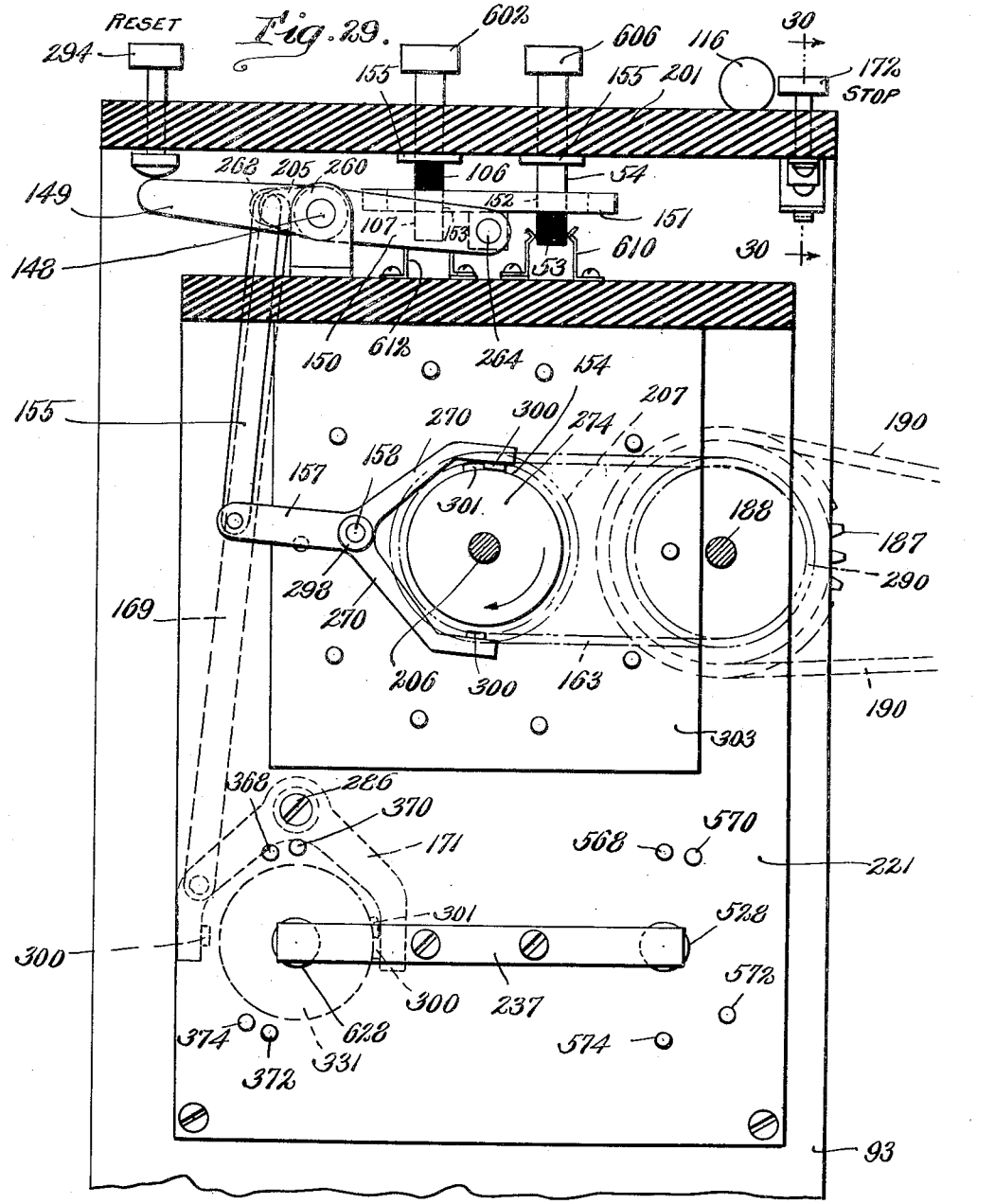
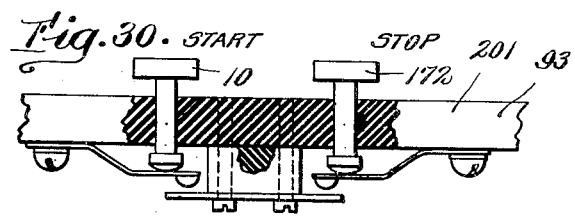
Inventor.
Otto Edward Wolff
by David Pines atty.

Nov. 14, 1939.   O. E. WOLFF   2,179,535
MACHINE FOR HANDLING SHEET MATERIAL
Filed March 11, 1938   20 Sheets-Sheet 15

Inventor.
Otto Edward Wolff
by David Rines
atty.

Nov. 14, 1939.   O. E. WOLFF   2,179,535
MACHINE FOR HANDLING SHEET MATERIAL
Filed March 11, 1938   20 Sheets-Sheet 16

Inventor.
Otto Edward Wolff
by David Rines Atty.

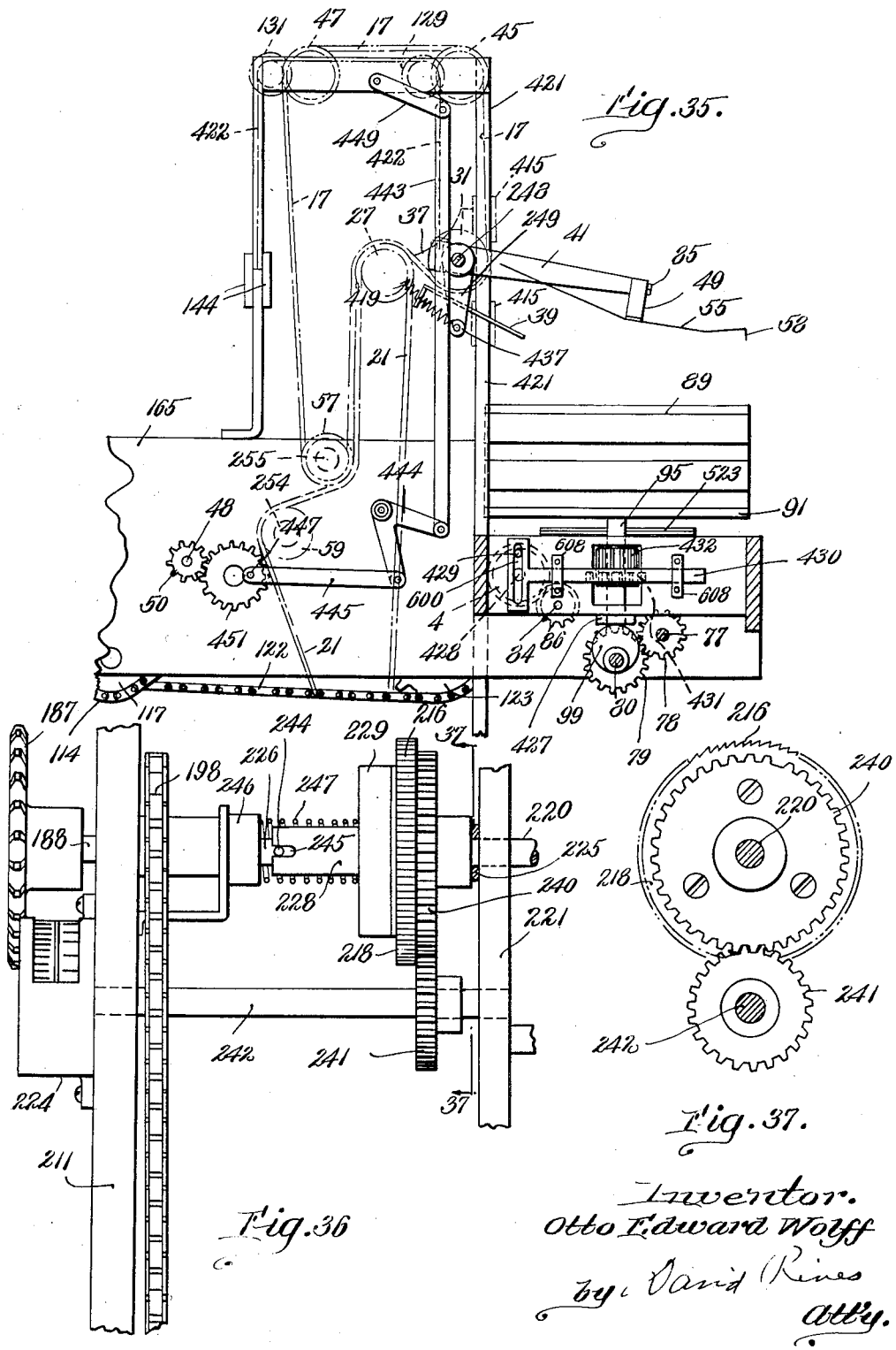

Fig. 38.

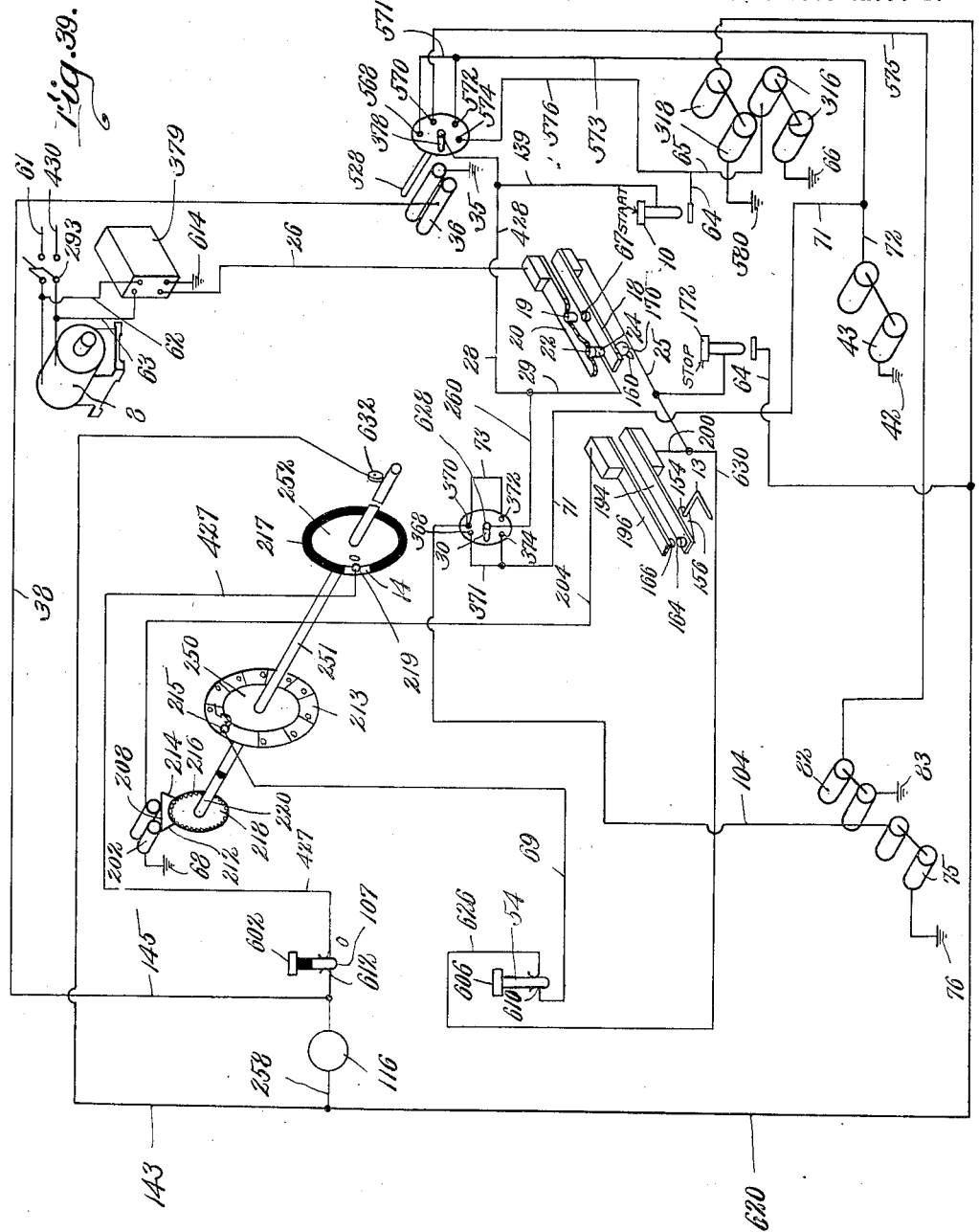

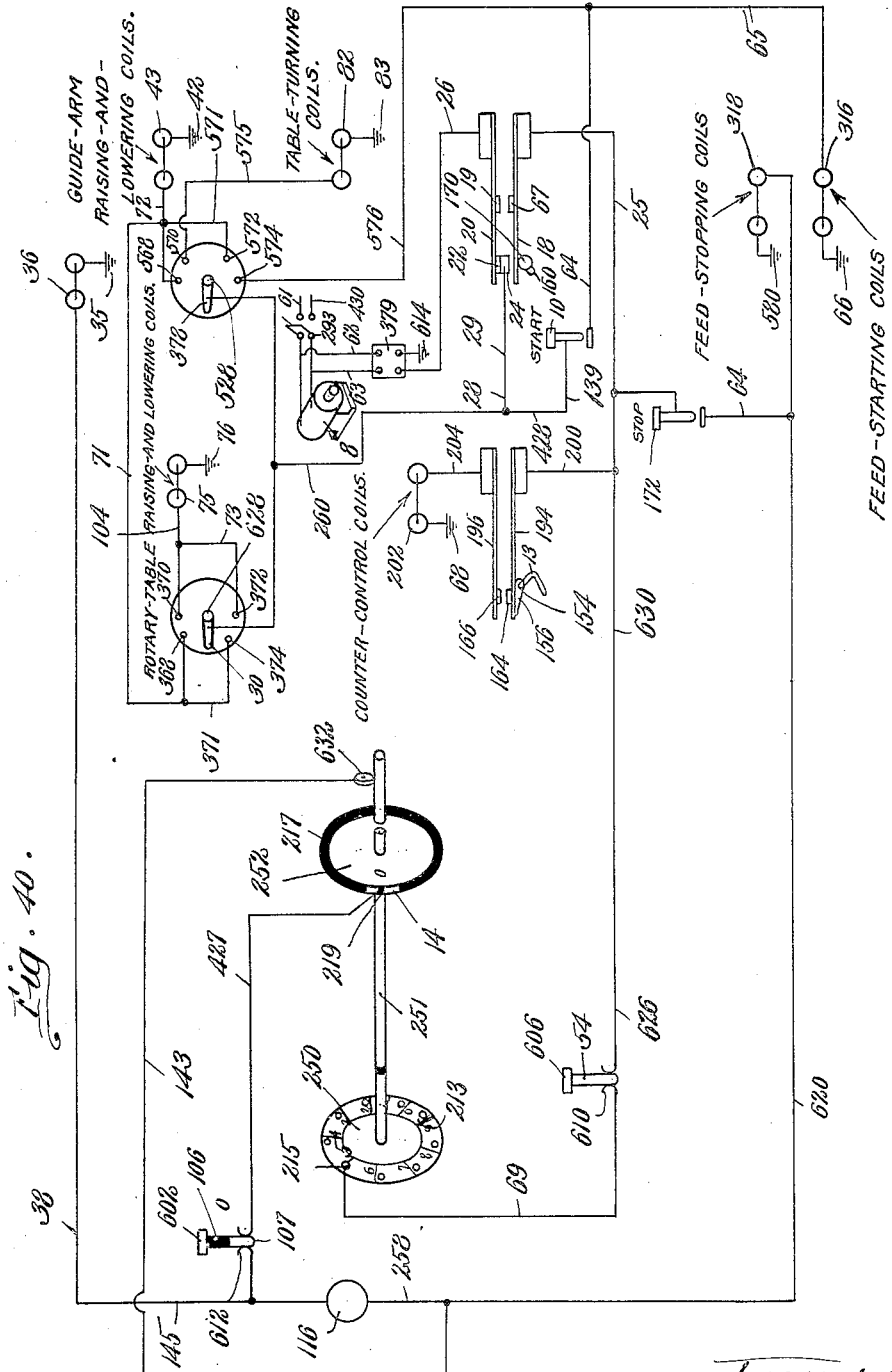

Patented Nov. 14, 1939

2,179,535

UNITED STATES PATENT OFFICE 2,179,535

MACHINE FOR HANDLING SHEET MATERIAL

Otto Edward Wolff, Arlington, Mass., assignor to Paul S. Bauer, Belmont, Mass., trustee of the R. S. Bauer Trust Application March 11, 1938, Serial No. 195,408

66 Claims. (Cl. 93—93)

The present invention relates to machines for handling sheet material, and more particularly such sheet material as newspapers and periodicals.

In copending applications, Serial Nos. 43,928 and 104,628, respectively filed on October 7, 1935 and October 8, 1936, which matured on October 11, 1938, into Letters Patent 2,132,451 and 2,133,264, respectively, there are disclosed machines for collecting into bundles or stacks, newspapers as they are delivered from the press, or returned newspapers, magazines and the like.

An object of the present invention is to improve upon the machines of the above-described applications.

According to the machines disclosed in the said applications, the newspapers are first automatically separated out from a hopper, after which they are counted, in order that the bundles or stacks shall contain predetermined numbers of newspapers to be forwarded to various newsdealers, on order. The values of these predetermined numbers, which are different for the different newsdealers, are determined by suitably designed plates, one corresponding to each newsdealer. When a newsdealer changes the number of newspapers ordered, it becomes necessary, according to the disclosure of Letters Patent 2,132,451, to manufacture a new plate, corresponding to the changed number. As disclosed in Letters Patent 2,132,264, a common plate may be employed, but provided with adjustable lugs, the adjustment of which corresponds to different numbers.

A further object of the present invention, therefore, is to provide a new and improved machine of the above-described character with the aid of which it shall be possible to determine the predetermined numbers manually, or at will, and without the necessity for employing the said plates at all.

Other and further objects will be explained hereinafter and will be particularly pointed out in the appended claims.

The invention will now be described in connection with the accompanying drawings, in which Fig. 1 is a side elevation of a machine embodying the present invention, in preferred form, a stack of newspapers being shown accumulated on the stack-receiving table at the right of the machine;

Fig. 2 is a section, upon a larger scale, of the switch mechanism controlled by the counting finger, the section being taken upon the line 2—2 of Fig. 6, looking in the direction of the arrows;

Fig. 3 is a similar enlarged section of the switch mechanism controlled by the cams for raising the table under the hopper, the section being taken upon the line 3—3 of Fig. 6, looking in the direction of the arrows;

Fig. 4 is a perspective, upon a scale intermediate between the scales of Figs. 1 and 2, of the counting finger and the switch-actuating cam actuated therewith;

Fig. 5 is a side elevation of the machine, similar to that of Fig. 1, but looking from the side opposite to that of Fig. 1;

Fig. 6 is a corresponding plan, but with the stack of newspapers omitted, and with parts broken away, for clearness;

Fig. 7 is a longitudinal vertical section of the machine, taken upon the line 7—7 of Fig. 6, looking in the direction of the arrows, showing not only the said accumulated stack of papers, but also their feeding action as a preliminary to the stacking, and showing also the counting finger, in dotted lines;

Fig. 8 is an end elevation, showing the delivery end of the machine, looking toward the left, as viewed in Figs. 1, 6 and 7, with the stack of newspapers on the stack-receiving table;

Fig. 11 is a plan, but upon a larger scale, of the clutch mechanism for controlling the beforementioned table-raising cams, partly in horizontal section upon the line 11—11 of Fig. 5, looking in the direction of the arrows, with a part broken away, for clearness;

Fig. 12 is a vertical section taken upon the line 12—12 of Fig. 5 or Fig. 11, looking in the direction of the arrows, a part being shown broken away, for clearness;

Fig. 13 is a vertical section taken upon the line 13—13 of Fig. 12 or Fig. 14, looking in the direction of the arrows, parts of the machine not visible in this section being indicated by dotted lines;

Fig. 14 is a vertical section taken upon the line 14—14 of Fig. 11 or 33—33 of Fig. 6, looking in the direction of the arrows;

Fig. 15 is a vertical section taken upon the line 15—15 of Fig. 6, looking in the direction of the arrows, the section being upon a larger scale than in Fig. 6, and a part being broken away, for clearness;

Fig. 16 is a vertical section taken upon the line 16—16 of Fig. 15, looking in the direction of the arrows, parts of the machine not visible in this section being indicated by dotted lines;

Figure 9:
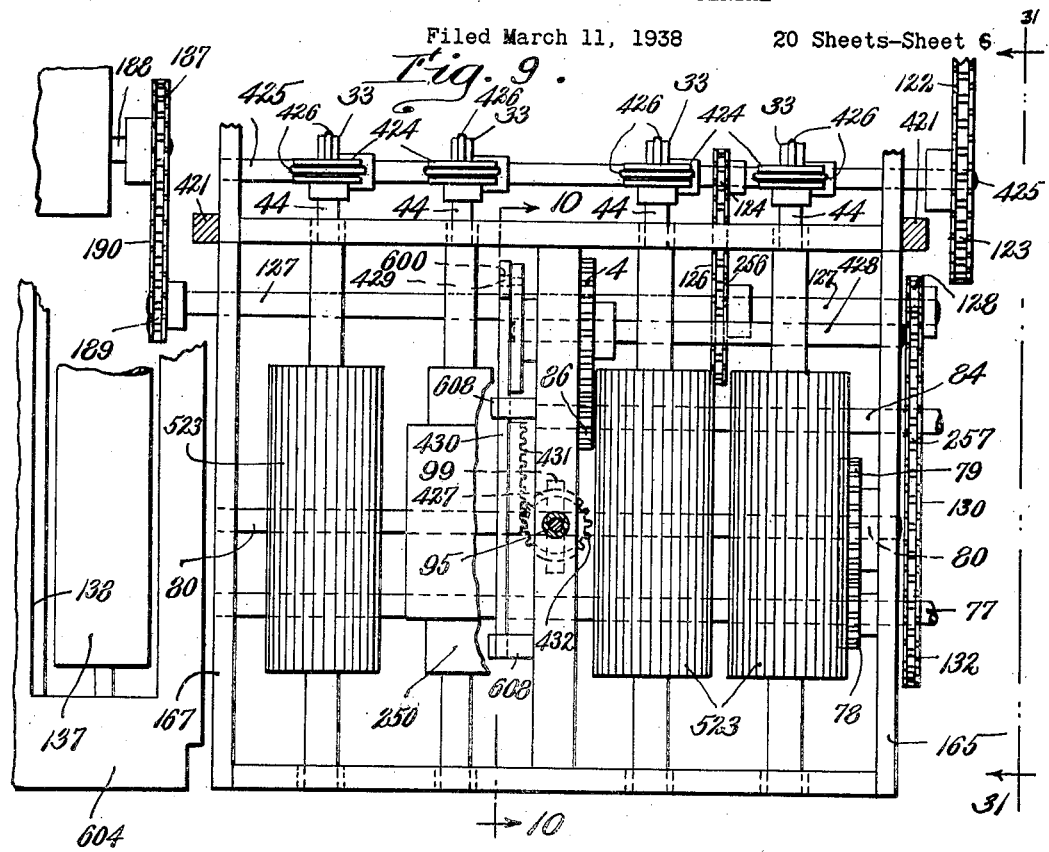
Fig. 9 is a horizontal section taken upon the line 9—9 of Fig. 1, looking downward, in the direction of the arrows, but upon a larger scale than in Fig. 1.
Figure 10:
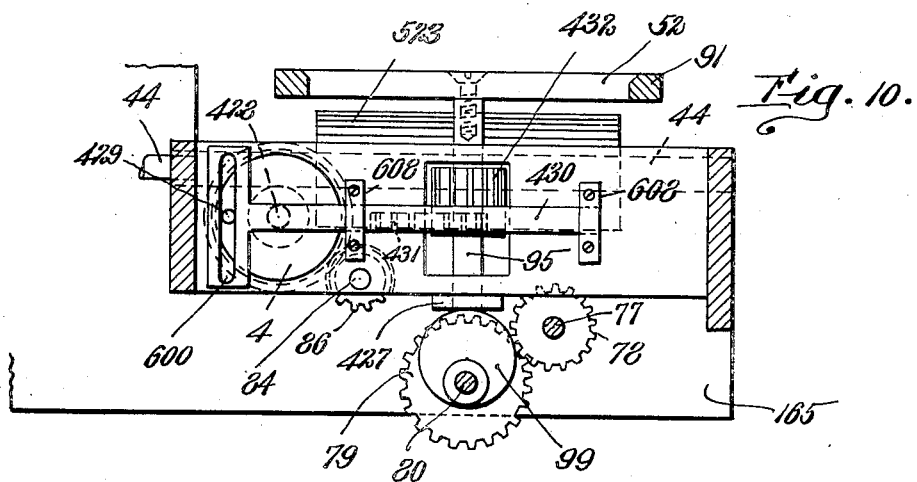
Fig. 10 is a vertical section taken upon the line 10—10 of Fig. 9, looking in the direction of the arrows.
Figure 17:
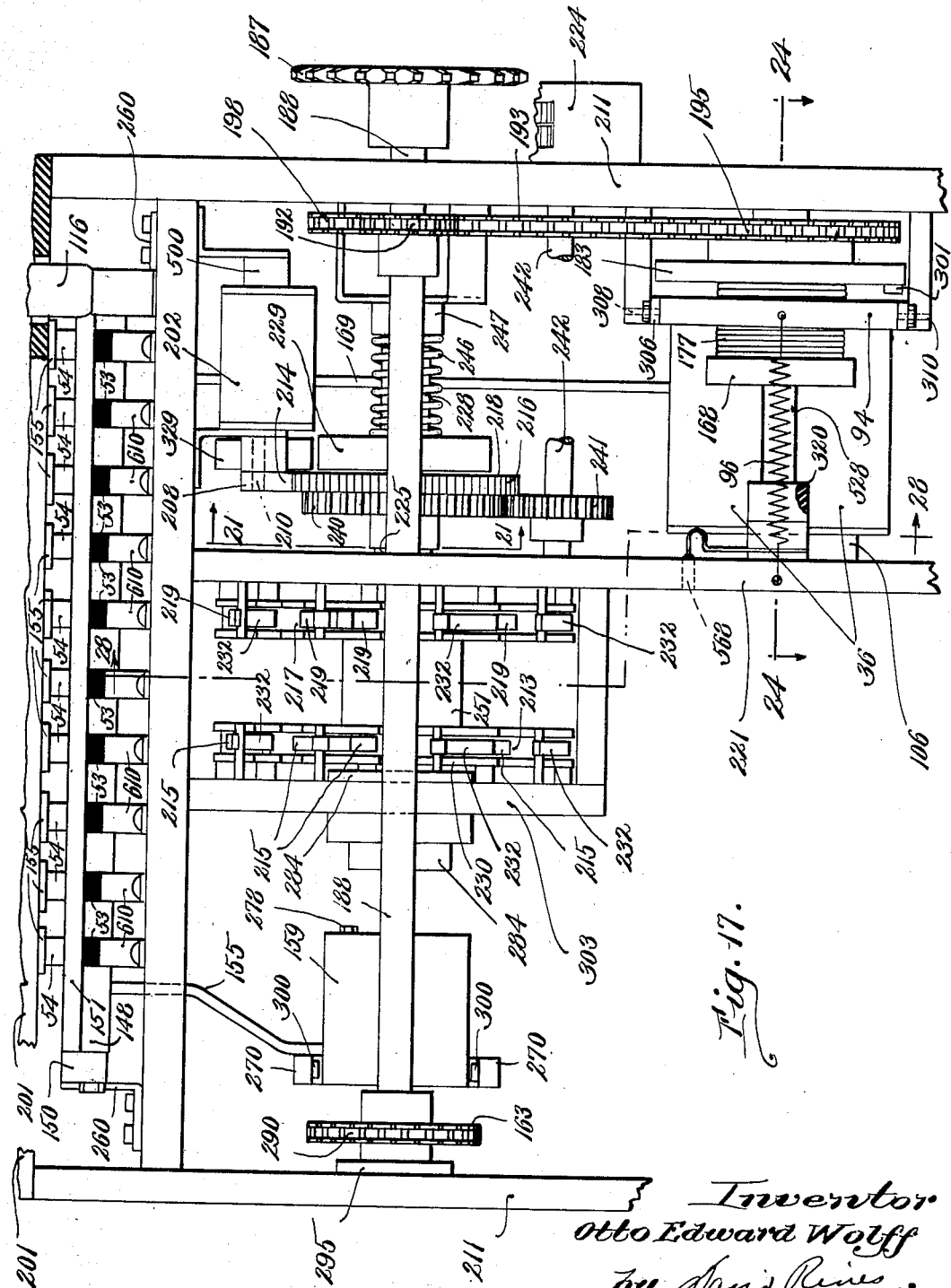
Figure 31:
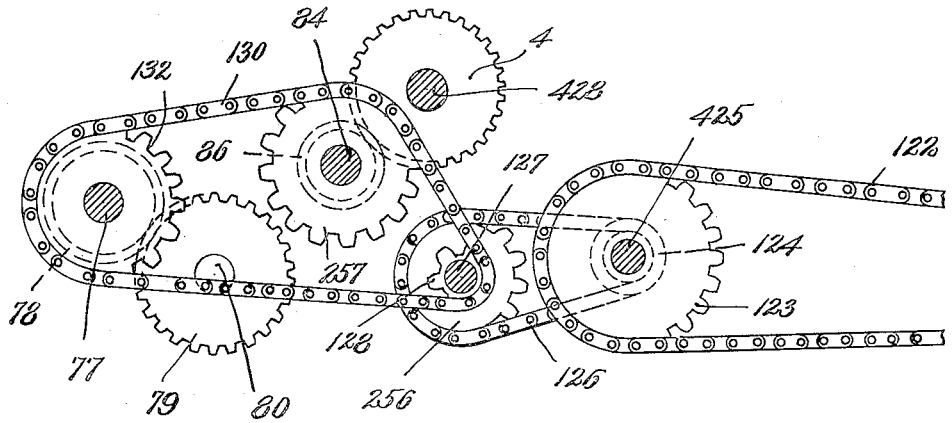
Figures 41, 42:
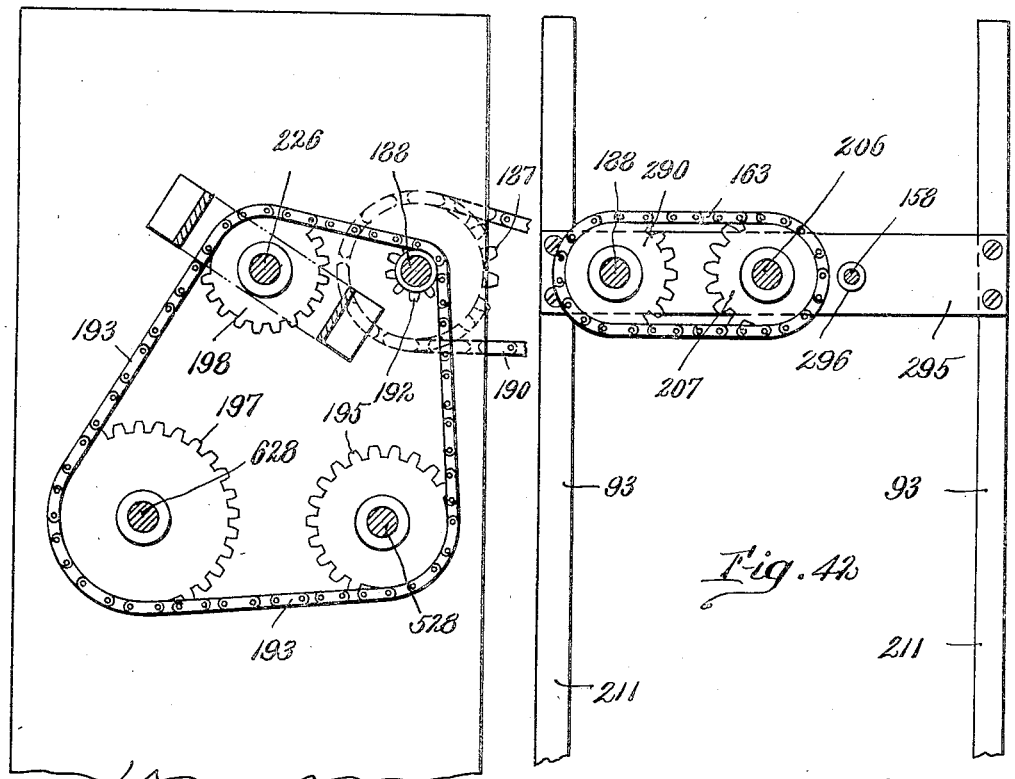
Figure 32:
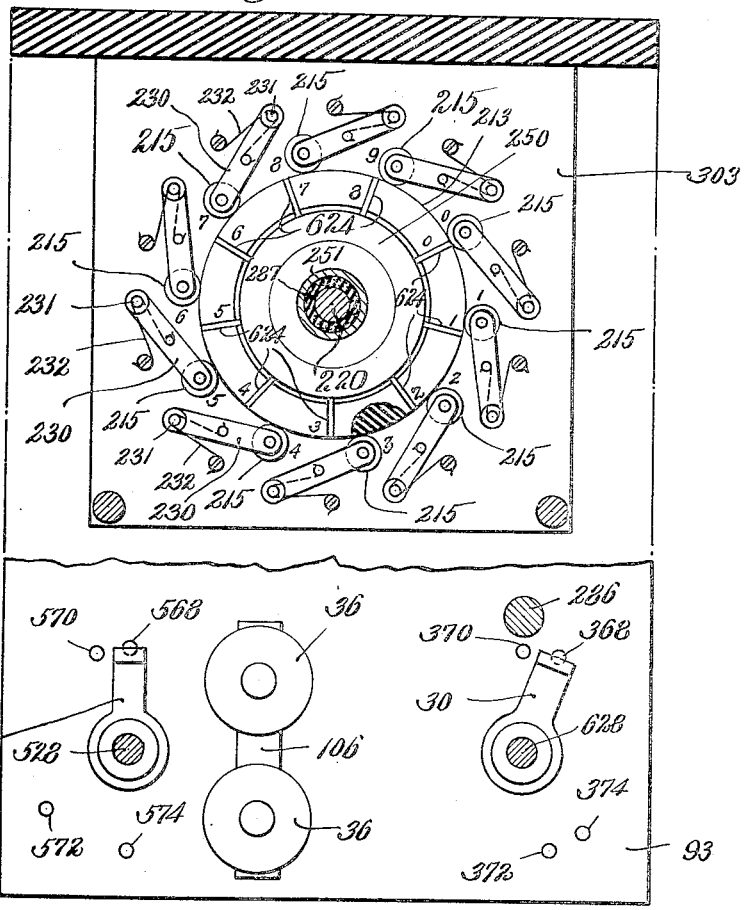
Figure 33:
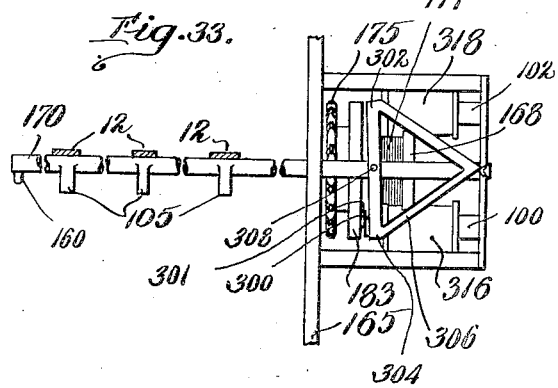
Figure 34:
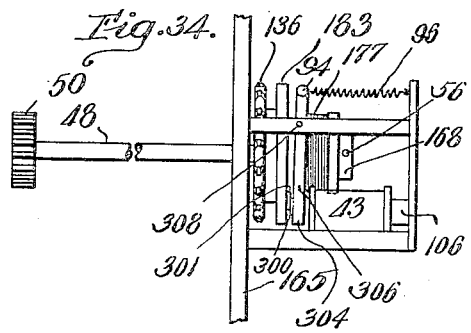

Figs. 17, 18 and 19 are sections taken upon the lines 17—17, 18—18 and 19—19, respectively, of Fig. 1, but upon a larger scale, looking in the directions of the respective arrows;

Fig. 20 is a vertical section taken upon the line 20—20 of Fig. 1 or Fig. 28, looking in the direction of the arrows;

Fig. 21 is a vertical section taken upon the line 21—21 of Fig. 17, looking in the direction of the arrows;

Fig. 22 is a detail view of the units commutator disc, as viewed upon the line 32—32 of Figs. 18 and 20, in the direction of the arrows, or as viewed upon the line 28—28 of Figs. 6, 17 and 19, in a direction opposite to the direction of the arrows;

Fig. 23 is a section taken upon the line 23—23 of Fig. 22, looking in the direction of the arrows;

Fig. 24 is a horizontal section, taken on the line 24—24 of Fig. 17, looking in the direction of the arrows;

Fig. 25 is a detail view, similar to Fig. 22, of the tens commutator disc, as viewed upon the line 28—28 of Figs. 6 and 17, in the direction of the arrows, or as viewed upon the line 32—32 of Figs. 18 and 20, in a direction opposite to the direction of the arrows;

Fig. 26 is a section taken upon the line 26—26 of Fig. 25, looking in the direction of the arrows;

Fig. 27 is a section taken upon the line 27—27 of Fig. 28, looking in the direction of the arrows;

Fig. 28 is a vertical section taken upon the line 28—28 of Figs. 6, 17 and 19, looking in the direction of the arrows, or upon the line 32—32 of Figs. 18 and 20, in a direction opposite to the direction of the arrows;

Fig. 29 is a vertical section taken upon the line 29—29 of Figs. 6 and 19, looking in the direction of the arrows, but upon a larger scale;

Fig. 30 is a vertical section taken upon the line 30—30 of Figs. 6 and 29, looking in the direction of the arrows;

Fig. 31 is a vertical section taken upon the line 31—31 of Fig. 6, looking in the direction of the arrows, but upon a larger scale;

Fig. 32 is a vertical section taken upon the line 32—32 of Figs. 18 and 20, looking in the direction of the arrows, or upon the line 28—28 of Figs. 6, 17 and 19, looking in a direction opposite to the direction of the arrows;

Fig. 33 is a vertical section similar to Fig. 14, taken upon the line 14—14 of Fig. 11 or 33—33 of Fig. 6, upon a larger scale than in Fig. 6, but upon a smaller scale than in Fig. 14, and showing further details;

Fig. 34 is a corresponding section similar to Fig. 15, showing further details;

Fig. 35 is a fragmentary view corresponding to Fig. 1, partly in vertical section upon the line 10—10 of Fig. 9, looking in the direction of the arrows, and showing the parts in positions different from those of Fig. 1;

Fig. 36 is a section taken upon the line 36—36 of Fig. 19, looking in the direction of the arrows;

Fig. 37 is a section taken upon the line 37—37 of Fig. 36, looking in the direction of the arrows;

Fig. 38 is a circuit diagram;

Figs. 39 and 40 are circuit diagrams, simplified with respect to Fig. 38;

Figs. 41 and 42 are sections taken respectively upon the lines 41—41 and 42—42 of Fig. 19, looking in the directions of the arrows; and Fig. 43 is a vertical section taken upon the line 43—43 of Fig. 20, looking in the direction of the arrows.

Many parts of the machine illustrated herein are described briefly, or not at all, because full descriptions thereof will be found in the said applications, to which reference may be made. The present machine, however, involves differences that will be described with some particularity. It is contained largely between side frame plates or walls 165 and 167, but a large portion of the controlling mechanisms therefor is contained within a housing 93.

A plurality of newspapers 2 are shown in Fig. 7 in lapped relation, upon inclined continuously traveling conveyor belts 3, mounted over pulleys 74 and 111. The left-hand ends (as shown in Fig. 7) of the inclined conveyor belts 3 may be disposed adjacent to a newspaper press, a stack of newspapers, another conveyor, or any other source of supply of newspapers. The belts 3 receive the newspapers 2 from the source of supply and feed them under a lower projecting finger of an inclinedly disposed shield wall 5, disposed in the path of travel of the papers, just beyond the right-hand ends of the conveyor belts 3, into a hopper 339, between the wall 5 and a similarly inclinedly disposed shield wall 11. The shield wall 11 is also disposed in the path of travel of the papers, as will hereinafter appear, and its lower end is provided with a similar lower projecting finger 16. Though the machine is shown in connection with newspapers, preferably fed with one of the unfolded edges 7 forward, it will be understood that other sheet material, such as magazines and other periodicals, may also be treated in this machine, or parts thereof; and the terms "newspaper", "paper", "sheet" and the like will, therefore, to avoid circumlocution of language, be often employed in the specification and the claims in this generic sense, except where the context or the state of the art may require otherwise.

If the hopper 339 is empty, the newspapers 2 are conveyed thereinto by the conveyor 3 under the shield wall 5, and on to a conveyor that is disposed at the bottom of the hopper 339, constituted of inclinedly disposed continuously traveling belts 9. The belts 9 are spaced slightly below the said projecting finger 16, but the space or gap or opening between them may be blocked or closed, as hereinafter described. The number of belts 9 is shown in Fig. 6 as four, with spaces between them. The belts 9 travel continuously forward, at a higher speed than the belts 3, over pulleys 32 and 34, the former adjacent to the right-hand ends of the inclined conveyor belts 3, at the left-hand end of the hopper 339, as viewed in Fig. 7, and the latter a considerable distance to the right, beyond the confines of the hopper 339. They pass also over idler rolls 238 and a roll 108 positively driven by a belt 239. The roll 108 is provided with small projecting bent rods 87 for engaging the bottom sheets in the hopper 339, thereby to agitate or stir them, so as to enable the belts 9 more easily to feed them out of the hopper 339, as hereinafter described.

As the first newspaper 2 is delivered by the conveyor belts 3 into the hopper 339, it is carried by the belts 9 forward, or toward the right, as viewed in Fig. 7, under a hold-down weight 88, pivoted at 90. When the said space or opening between the finger 16 and the belts 9 is blocked or closed, this first newspaper 2 will engage the shield wall 11, so that the further progress of this first newspaper 2 will be temporarily blocked. The second newspaper 2 is similarly carried forward, to the right, on top of the first newspaper 2, and under the hold-down weight 88, until its further progress is similarly blocked. The third newspaper 2 is similarly carried forward, to the right, on top of the second newspaper, into similar engagement with the wall 11, and so on. The hold-down weight 88 is caused by gravity or a spring 92 to press the papers in the hopper 339 against the conveyor belts 9.

The conveyor 3 continues thus to feed the papers 2, in superposed relation, into the hopper 339, until the level of the stack of papers thus accumulated therein is high enough to touch the bottom projecting finger of the shield 5, as shown more particularly in Fig. 7. As no more sheets can then be fed past the shield 5, the level of papers on the belt 3 in the hopper 339, and their consequent weight upon the belts 9, will be practically constant.

When the said space between the finger 16 and the belts 9 becomes opened, as will be explained more fully hereinafter, the conveyor belts 9 will feed the lowermost newspapers 2 in the hopper 339 forward, under the shield 11 and into the space outside, to the right of the hopper 339, as viewed in Fig. 7. The next-lowest paper will then be similarly fed out of the hopper, and so on. The shield wall 11 may be made adjustable to regulate the said space between the finger 16 and the belts 9, thereby to control the number of newspapers 2 passing thereunder at any one time.

After the papers have thus been caused to travel out of the hopper 339, they are fed further forward toward a table 91, on which they become accumulated in the form of a stack 89. During the feeding of the papers out of the hopper 339, and before they reach the table 91, they are counted. As each newspaper 2 advances from left to right, as viewed in Fig. 7, out of the hopper 339, its forward edge 7 engages, and passes under, a counting finger 13, illustrated more particularly in Fig. 7, above the right-hand portions of the belts 9. The finger 13 is integrally fixed to a horizontally disposed shaft 154, about which it is pivotally actuated toward the right by the traveling newspapers, becoming thus raised, in opposition to the force exerted by a two-way leaf spring 194, above a supporting plate (not shown) upon which the finger 13 normally rests.

The two-way leaf spring 194 carries a contact member 164 that, as illustrated more particularly in Fig. 2, is normally separated from a cooperating contact member 166, carried by a two-way leaf spring 196. The leaf spring 196 is normally biased, so as normally to contact with a limiting stop 6. In response to each pivotal raising of the finger 13 by the successive papers 2, as they travel out of the hopper 339, a cam 156, that is fixed to the pivotal shaft 154, effects engagement of the contact member 164 with the contact member 166, raising the leaf spring 196 out of contact with the limiting stop 6. The spring 194 continuously engages the cam 156 to force the finger 13 back into contact with its supporting plate after each paper has traveled on beyond it, toward the table 91.

Each raising and lowering of the counting finger 13 will result in registering a count, as will be hereinafter explained, to indicate that another newspaper 2 has been conveyed by the conveyor belts 9 from out of the hopper 339 and stacked on the table 91.

The contact member 164 is connected, through the leaf spring 194, to a conductor 200, and the contact member 166, through the leaf spring 196, to a conductor 204. The contact member 166 is connected, as illustrated in Figs. 38 to 40, by way of the leaf spring 196 and the conductor 204, to one side of counter-controlling electromagnetic coils 202. The coils 202 are mounted upon a magnet core 500 provided with an armature 329, that is intermediately pivoted at 210, as illustrated more particularly in Figs. 17, 18, 20 and 21. The contact member 164 is similarly connected, by way of the leaf spring 194 and the conductor 200, and by way of other connections that will be described hereinafter, to the other side of the counter-controlling electromagnetic coils 202. The said other connections include a movable contact member 22 on a two-way leaf spring 20 that is normally in engagement with a stationary contact member 24 (see particularly Figs. 3 and 38 to 40).

The contact member 164 is also connected by the leaf spring 194 and the conductor 200 to a set of ten units push-button switches 606, a set of tens push-button switches 602, and selector commutating discs 213 and 217. In the said applications, the feeding and stacking of the papers is disclosed as under the control of metal plates, cut away or otherwise designed in a particular manner, with the cuts or other designs of the individual plates corresponding to predetermined numbers of the papers to be fed and stacked. According to the present invention, the number of papers to be conveyed out of the hopper 339, and stacked on the table 91, is predetermined manually by manual adjustment of the proper push-button switch or switches 602 and 606.

At each closing of the contact members 164 and 166, in response to the actuation of the counting finger 13, therefore, the circuit of the counter-controlling electromagnetic coils 202 becomes closed, by way of the conductors 200 and 204 to control the actuation of a counter 218.

The counter 218 is shown as a ratchet wheel provided with slightly offset ratchet teeth 216. This ratchet wheel 218 is fixed to a counter shaft 220, which is connected by gears 240 and 241 and a shaft 242, as shown more particularly in Figs. 17 to 20, or any other suitable mechanism, to actuate a dial 224. The shaft 220 is journaled in ball bearings 223 provided in walls 303 and 221 in the housing 93, and extends to the right of the wall 221, as viewed in Figs. 17 and 20, toward one of the outer walls 211 of the housing 93. The left-hand ball bearing 223, as viewed in Fig. 20, is mounted in a rotary collared sleeve 284, for a purpose that will appear hereinafter. The collar of the sleeve is disposed at the right of the wall 303, as viewed in Fig. 20, and the body thereof extends through the wall 303, to the left thereof. The counter ratchet wheel 218 is fixed by means of a pin 307 on the extending part of the shaft 220 and is separated from the wall 221 by a shim 225 against which it is thrust by a coil spring 246. The ratchet wheel 218 is shown engaged by a friction-clutch disc 229 to provide a slip-clutch connection between the shaft 220 and a shaft 226 alined therewith. The clutch disc 229 is fixed to a sleeve 228 that is loosely mounted upon the shaft 220 and is constantly driven from a constantly driven sprocket wheel 198 upon the shaft 226. One end of the shaft 226 is journaled in a bearing 243 in one of the frame plates 211, and the other end extends freely into a socket 227 at the free end of the sleeve 228, and is locked to the sleeve 228 by a key 244 fixed to the shaft 226 and extending into a key slot 245 in the said end of the sleeve 228. The spring 246, coiled about the sleeve 228, thrusts against the friction-clutch disc 229 and a collar 247 that is fixed to the shaft 226. The friction-clutch disc 229 is thus yieldingly pressed constantly against the counter wheel 218 to provide a loose connection between the shafts 226 and 220 and to transmit rotative movement to the counter wheel 218 from the constantly driven sprocket wheel 198.

Continuous rotative movement of the counter wheel 218 is, however, prevented by a spring-controlled ratchet double pawl 208 mounted upon the armature 329 so as to be pivoted therewith at 210.

The pawl 208 is provided at its ends, on opposite sides of its pivot 210, with two oppositely acting pawl teeth 212 and 214 for engaging the ratchet teeth 216 of the ratchet counter wheel 218. The tooth 212 of the ratchet pawl 208 is held normally in engagement with a ratchet tooth 216 of the counter wheel 218 by a spring 222 that is mounted about the pivot 210 (Figs. 20 and 21). Upon the closing of the circuit of the electromagnetic coils 202 by the contact members 164 and 166, in response to the actuation of the counting finger 13, the armature 329 will be actuated by the energized coils 202 about its pivot 210, clockwise, as viewed in Fig. 21, in opposition to the action of the sprng 222. The pawl 208 will be rocked with the armature 329 upon which it is mounted, effecting the separation of the tooth 212 of the ratchet pawl 208 from the said ratchet tooth 216. The tooth 214 is, at the same time, actuated into engagement with another tooth 216. The next moment, the finger 13, as the paper 2 thereunder passes beyond it, will be actuated by the spring 194 to effect the actuation, in the opposite direction, of the cam 156, and the consequent separation of the contact members 164 and 166. This will result in the opening of this circuit of the coils 202. The spring 222 will thereupon rock the pawl 208 in the opposite direction, counter-clockwise, as viewed in Fig. 21, to cause the tooth 214 to release its tooth 216 and the tooth 212 to engage another tooth 216 of the ratchet wheel 218. The pawl 208 is actuated by the armature 329 of the magnet coils 202 and the spring 222 like an ordinary escapement pawl, with its teeth 212 and 214 engaging the teeth 216 of the ratchet wheel 218 alternately. The counter wheel 218 is thus rotated step-by-step from the sprocket wheel 198 through successive angular distances corresponding to one tooth 216 for each paper 2. Successive movements of the counting wheel 218, tooth by tooth, one tooth at a time, become thus registered on the dial 224, to register a total count corresponding to the papers 2 fed by the conveyor 9 out of the hopper 339.

The counter, the selector controlled thereby, and related mechanism are all contained in the housing 93.

After leaving the counting finger 13, the papers 2 are fed into the bite between vertically disposed continuously traveling lift belts 17 and 21 of a conveyor which feeds the newspapers 2, as they are received from the hopper 339, vertically upward. The conveyor belts 17 pass over a lower pulley or roll 51, fixed upon a shaft 255, a discharge pulley or roll 27, and smaller pulleys or rolls 31, 45 and 47. The conveyor belts 21 pass over the pulley 27, an intermediately disposed pulley 59, fixed upon a shaft 254, and an idler pulley 23. To maintain tension in the belts 21, the idler pulley 23 is free to move in a vertically disposed arc at the end of arms 101 pivoted to the frame of the machine at 103.

In order to maintain the point of delivery of the papers 2 above the topmost paper of the stack 89, the said delivery end of the conveyor, including the upper portions of the belts 17 and 21, and the rolls 27 and 31, is disposed above the belts 9 and the table 91.

The discharge pulleys or rolls 27 and 31 are carried by arm members 37 that are freely movable vertically, and are linked at 319 to the pivoted arms 101. In this vertical movement, they are guided by wheels 415, that are carried by the arm members 37, so as to roll on a vertically disposed track of a supporting column 421.

Upon reaching the bite between the conveyor belts 17 and 21, the papers are turned upward, around the large pulley 57, and toward and over the pulley 27. Each paper 2 is then fed from above the table 91, at the left thereof, as viewed in Fig. 7, at a downward incline, on to the top of the stack 89 accumulated on the table 91. During this downwardly inclined feeding, the papers travel over a downwardly inclined guide 39, and under downwardly inclined guide arms or members 55, toward and against stops, constituted of integrally bent portions 58 of the guide members 55. The bent portions 58 project downward, so as to be engaged by the forward edges 7 of the newspapers, thus limiting the further travel of the papers. The newspapers thus become successively deposited on the top of the stack 89 on the table 91, each on top of the previously deposited paper 2, in engagement with the stops 58. The stack 89 rises higher and higher as the newspapers are successively conveyed thereto, until the desired number of newspapers, as determined by the count of the counting finger 13, has been collected in the stack 89. The guide members 55 constitute part of the elevator assembly that moves up with the discharge pulleys or rolls 27 and 31 as the height of the stack 89 increases.

The guide members 55 are respectively disposed at opposite sides of the center of the stack 89 of the papers, and predetermine the position occupied by the stack 89 on the table 91. To equalize the pressure exerted by them on the uppermost sheet of the stack 89, these two guide members 55 may be separated by a yoke 49 that is pivoted at 85 to an arm 41. The guide members 55 are thus always maintained in proper position for guiding the papers to the top of the stack 89.

Through the medium of the yoke 49 and the arm 41, the freely movable rolls 27 and 31 and the arm members 37 by which they are carried, the upper portion of the conveyor 21, and related parts are automatically raised vertically, in accordance with the height of the stack 89. This is effected by the impact of the papers, passing under the guides 55, in opposition to the force of gravity. The weight of the parts and a spring 419 normally maintain the guide arms 55 yieldingly in engagement with the top of the stack 89 and pressing yieldingly downward thereon. To reduce the upward force which the papers must exert in order to lift the guide members 55 higher and higher as they travel thereunder, a counterweight 144 is connected to the members 37 by cords 422, running over pulleys 131 and 129.

The idler pulley 23 and related parts move up and down with the delivery end of the conveyor 17, 21. The lowermost positions of the pulleys 27 and 31 and the arms 101 with the idler pulley 23 are indicated in Fig. 1 by dotted lines.

At such times as the said space under the finger 16 and above the belts 9 is blocked, so as to stop the further feed of the newspapers 2 out of the hopper 339, it is desirable that the continuously traveling belts 9 do not engage the lowermost newspaper 2 in the hopper 339. Provision is, therefore, made for lifting the stack of newspapers in the hopper 339 up, out of contact with the belts 9, in synchronism with the movements of the other parts of the machine. The mechanism for bringing this about will now be described.

A table 12 is constituted of a plurality of bar supports respectively disposed between the belts 9. These bar supports are rigidly secured together, in a common frame-work, to a pivotally mounted rod 125. The table 12 normally occupies an ineffective position, below the surface of the plurality of belts of the conveyor 9. In this ineffective position, the table 12 does not interfere with the feeding of the newspapers 2 by the belts 9 out of the hopper 339, through the said space under the finger 16. Upon the completion of a cycle of operations, immediately after every feeding of the desired predetermined number of papers 2 out of the hopper 339, the table 12 is raised pivotally as a unit about the rod 125, from its normally ineffective position, up between the belts 9 into its effective position. This may be brought about in any desired manner, as by a half-revolution of cams 105, mounted upon a rod or shaft 170, as more particularly illustrated in Figs. 7 and 33, and diagrammatically in Fig. 38. The shaft 170 is journaled in the frame plates or walls 165 and 167 of the machine. It is this raising of the table 12 that results in blocking the said gap or space under the finger 16, thus stopping the further feed of the papers out of the hopper 339 below the shield 11. It results also, however, in lifting the newspapers 2 up off the belts 9, so that the belts 9 could not further convey the newspapers out of the hopper 339 even if the said space were not blocked. Upon the lowering of the table 12 from its effective position, above the belts 9, to its ineffective position, below these belts, the feeding of the papers 2 out of the hopper 339 by the belts 9 recommences, and the machine goes through another cycle of operations.

The raising of the table 12, upon the completion of each cycle of operations, is automatically effected by the cams 105, in synchronism with the operation of the rest of the machine. It is similarly automatically lowered at the commencement of a new cycle of operations; and it may be lowered also, when first starting the machine into operation, by means of push-button starting switch 19. The circuits for effecting this result will be described hereinafter, in connection with a description of Figs. 38 to 40. Such description may, however, be anticipated at this point by stating that the pivotally mounted rod 170, upon which the cams 105 are mounted, is actuated through semi-revolutions by means of two electromagnetic coils 316 or two electromagnetic coils 318, shown more particularly in Figs. 5, 6, 11 to 14 and 33, and diagrammatically in Figs. 38 to 40. The circuits of these electromagnetic coils 316 and 318, as well as of other electromagnetic coils illustrated herein, are opened and closed, as described hereinafter, and also at considerable length in the said applications, by the counter-and-selector mechanism, under the control of the counting finger 13. One semi-revolution of the shaft 170, at the end of a cycle of operations, results in the cams 105 raising the table 12 to stop the feed. The next semi-revolution of the shaft 170, at the commencement of a new cycle of operations, results in the lowering of the cams 105, and the consequent lowering of the table 12 by gravity, whereupon the feeding of the papers 2 out of the hopper 339 by the belts recommences.

The shaft or rod 170 is provided with a further cam 160, shown more particularly in Figs. 3, 33 and 38 to 40, disposed at substantially 180 degrees to the cams 105. When the cams 105 are raised, in order to raise the table 12, the cam 160 occupies its ineffective position, illustrated more particularly in Fig. 3. When the cams 105 are lowered, however, to permit relowering of the table 12, the cam 160 actuates a contact member 67, mounted on a leaf spring 18, into engagement with a contact member 19. The contact member 19 is mounted on the two-way leaf spring 20 that, as before described, is connected in circuit with the counter-controlling electromagnetic coils 202.

In the position illustrated in Fig. 3, the cam 160 occupies a position such that the contact members 67 and 19 are out of engagement, and the movable contact member 22 on the leaf spring 20 contacts with the before-mentioned stationary contact member 24. Upon the engagement of the contact members 67 and 19, however, the leaf spring 20 becomes raised, lifting the normally closed contact member 22 on the leaf spring 20 out of engagement with the contact member 24. Conductors 25, 26 and 29 are respectively connected to the leaf springs 18 and 20 and the contact member 24, to control, in connection with the contact members 67 and 19, the circuit of the electromagnetic coils 316 and 318 for actuating the shaft 170 by half-revolutions, as before described. The coils 316 and 318 are respectively provided with cores 100 and 102.

The semi-rotations of the shaft 170 to effect raising and lowering of the table 12, and opening and closing movements of the contact members 24, 22 and 67, 19, are, as before stated, under the control of the electromagnetic coils 316 and 318. The energization of these coils renders effective a spring-controlled clutch of the nature described in the said applications. The deenergization of these coils results in the clutch becoming ineffective. Similar clutches are under the control of other electromagnetic coils disclosed herein. For simplicity, the same reference numerals will be applied to corresponding parts of all these clutches.

A collar 168 is fixed to the end of the shaft 170 near the side plate 165, as shown more particularly in Figs. 11, 12, and 33, by means of a screw 56. A half-revolution of the collar 168 will, therefore, result in raising the table 12 to its effective position, so as to close the gap under the finger 16, as before described, to stop the feed of the papers out of the hopper 339, and a further half-revolution of the collar 168 will result in relowering the table 12 to its ineffective position. These half-revolutions are effected by clutching the collar 168 to a drum 173 that is normally mounted loosely on the shaft 170 so as to be free to turn thereon. The drum 173 is constantly rotated, at constant speed, from a sprocket gear 175 that is integral therewith. The clutching of the collar 168 to the constantly rotating drum 173 is effected by means of a coiled spring 177 that is wound around the outside of the drum 173. One end 179 of the spring 177 is held in a hole 192 in the collar 168, and the other end 181 is held in a hole 191 of a collar 183 that normally is loosely mounted on the drum 173, so as to turn freely thereon.

When the spring 177 is free to do so, it will, through its own resiliency, engage and wind itself tightly about the constantly rotating drum 173, so as to become tensioned thereagainst, by friction. The spring 177 will thus be caused to rotate with the drum 173, carrying with it the collars 183 and 168, and thereby effecting the rotation of the shaft 170, to which the collar 168 is fixed by the screw 56. The tensioned spring 177 thus effects the clutching of the shaft 170 to the drum 173, so as to become rotated from the sprocket wheel 175. The shaft 170 becomes unclutched from the constantly rotating drum 173 when the spring 177 is caused to unwind itself from this drum 173. The mechanism for effecting this winding and unwinding of the spring 177 and the consequent intermittent clutching and unclutching of the shaft 170 will now be described.

A lower armature 304 cooperates with the lower table-lowering electromagnetic coils 316, and an upper armature 302 cooperates with the upper table-raising electromagnetic coils 318, as illustrated in Figs. 11 to 14 and 33. The armatures 302 and 304 are disposed opposite to each other, at the upper and lower ends of a yoke 306 that is pivoted to move to the right and to the left, as viewed in Figs. 12 and 33, about pivots 308 and 310.

At times when the circuit of the lower electromagnetic coils 316 is closed, the circuit of the upper electromagnetic coils 318 is open, and vice versa. The energization of the upper electromagnetic coils 318 will result in pivotal actuation of the upper armature 302 to the right, and the lower armature 304 to the left, as viewed in Figs. 12 and 33, about the pivots 308 and 310; and the energization of the lower electromagnetic coils 316 will result in similar actuation of the armatures 302, 304 in the opposite directions, into the position shown in Fig. 12.

The armatures 302 and 304 are each provided with a lug 300. That lug 300 that happens to be positioned to the left, as viewed in Figs. 12 and 33, will, owing to the action of the spring 177, normally be engaged by a lug 301 on the collar 183. Such normal engagement is illustrated in Figs. 11, 13, 16 and 28 and in the lower portion of Fig. 29. In Figs. 12, 14, 15, 17, 24, 33 and 34, the lug 301 is shown out of engagement with the lug 300, for clearness, and in order not to complicate the drawings.

The lug 301 becomes released from its engagement with the lug 300 of either armature 302 or 304, however, when that particular armature becomes pulled over to the right, as viewed in Figs. 12 and 33, by its actuating coils 318 or 316. The lug 300 of the other armature will, at the same time, become actuated to the left, as also illustrated in Figs. 12 and 33, into the path of rotative movement of the lug 301 of the collar 183.

Immediately upon the disengagement of the lug 301 from the lug 300 of the lower armature 304, for example, in response to the actuation of the latter toward the right, into the position illustrated in Fig. 12, the spring 177 will wind itself tightly about the constantly rotating drum 173, effecting the before-described clutching of the shaft 170. The shaft 170 will then rotate for a half-revolution. More than a half-revolution of the shaft 170 is prevented by the lug 301 on the collar 183, during its rotation in its circular path about the axis of rotation of the drum 173, coming into engagement with the lug 300 of the upper armature 302. The rotation of the collar 183 will thus become interrupted, and the end 181 of the spring 177 will be held back from further rotation. This will effect a partial unwinding of the spring 177 from its frictional engagement with the drum 173, so as to render it loose again upon the drum 173. The drum 173 will continue to rotate, but the collar 168 and the shaft 170 secured thereto will have become unclutched therefrom. The shaft 170 will be stopped in a position such that the cams 105 thereof shall assume their lower position, to permit lowering of the table 12, by gravity. The cam 160 on the shaft 170 will, at the same time, become raised to close the contact members 69 and 17 and open the contact members 22 and 24. The closing of the contact members 69 and 17 will effect the closing of the circuits of the counter-controlling coils 202, push-button switches 606 and 602, the selector commutating discs 213 and 217, and the electromagnetic coils 316. The opening of the contact members 22 and 24 will effect the opening of the circuit to a master switch 378, by way of the conductor 29, and to a master switch 30, by way of a conductor 260.

When the lug 301 becomes disengaged from the lug 300 of the upper armature 302, similarly, the shaft 170 will become rotated through another half-revolution, until the lug 301 of the collar 183 engages the lug 300 of the lower armature 304. As the lugs 300 of the armatures 302 and 304 are positioned 180 degrees away from each other in the path of rotation of the lug 301 of the collar 183, the shaft 170 will, this time, be stopped in a position such that the cams 105 shall have raised the table 12 into its ineffective position, in which the papers 2 can not be fed out of the hopper 339. The cam 160 will, at the same time, effect the opening of the contact members 19 and 67 to open the said circuits of the counter-controlling coils 202, the push-button switches 606 and 602, the selector commutating discs 213 and 217 and the said electromagnetic coils 316, and the closing of the contact members 22 and 24, to make connection to the master switches 378 and 30.

The lugs 300 of the armatures 302 and 304 thus operate in alternation, to interrupt the rotation of the shaft 170 at the end of each half-revolution thereof. In response to the successive closings of the circuits of the upper and the lower electromagnetic coils 318 and 316, therefore, the shaft 170 becomes rotated through successive half-revolutions to effect intermittent actuation of the table 12, up and down, into its two effective and ineffective positions, and to control the contact members 67 and 19 and the contact members 22 and 24.

The yoke 306 is shown triangular in shape, with the base of the triangle connecting the armatures 302 and 304. The apex 315 of the triangle is actuated to one side and the other of an accentuating spring 317 as the armatures 302 and 304 are respectively actuated by their respective coils 318 and 316. This serves to lock the yoke 306 and the armatures 302 and 304 and the lugs 300 carried thereby in the positions into which they were last actuated.

The circuit of the coils 316 becomes closed to start the feed at the beginning of each cycle of operation, and the circuit of the coils 318 becomes closed to stop the feed at the end of each cycle of operation, under the control of the commutating discs 213 and 217 of the selector and the push-button switches 606 and 692. A shaft 528, on which the master switch 378 is mounted, is set into operation at the end of each cycle of operation by the closing of the circuit of electromagnetic coils 36. The final half-revolution of the shaft 170, for effecting the final raising of the table 12, to stop the further operation of the machine, is effected by closing the circuits of the electromagnetic coils 318 through the medium of the master switch 30. A shaft 628, on which the master switch 30 is mounted, may be set into operation by means of a clutch mechanism of the above-described character; not, however, under the control of electromagnetic coils, but mechanically, under the control of a reset push-button 294, as hereinafter described. The operation of the reset push-button 294 results also in actuating a similar clutch for returning the selector commutating discs 213 and 217 and related parts to their initial positions, as more fully described hereinafter. The shafts 528 and 628 of the respective master switches 378 and 30 are shown in Fig. 24 bridged by a leaf spring 237, and they are insulated from each other by separating collars 320 and 321.

The feeding and stacking of the papers 2 may be stopped manually at any time by an emergency stop push-button switch 172 that is connected in circuit with the upper electromagnetic coils 318 by connections hereinafter to be described. The closing of this circuit will effect the actuation of the shaft 170 through a half-revolution to raise the table 12 and thus stop the feed of the papers out of the hopper 339. The construction of the start and stop push-button switches may be as illustrated more particularly in Fig. 30.

Shafts 48, 77, 84 and 528 are provided with continuously rotating sprocket gears 136, 132, 257 and 195, respectively, for rotating them intermittently, through the medium of a drum 173 integral therewith, in the same way that the sprocket gear 175 rotates the shaft 170. These shafts 48, 77, 84 and 528, however, are actuated through complete revolutions, instead of through only half-revolutions, at each engagement of the lugs 301 of the collars 183 by the lugs 300 of the respective armatures 304. The two sets of electromagnetic coils 316 and 318 are, therefore, replaced by only a single set of coils 43 (Figs. 15, 16 and 34), 75, 82 and 36 (Figs. 17, 24 and 28), respectively, mounted upon a core 106, and provided with but a single armature 304. The relation of these coils to their respective shafts is shown in Figs. 5 and 6, and diagrammatically in Fig. 38. A biasing spring 96, attached to a bar or other support 94, positioned opposite to the armature 304 on the yoke 306, normally maintains the yoke 306 and the armature 304 thereon in the position illustrated, for example, in Figs. 15, 17, 24 and 34, so that the lug 301 normally engages the lug 300 of the armature 304. In other respects, the operation is substantially the same as described above in connection with Figs. 11 to 14.

When the coils 43, for example, become energized, the armature 304 is actuated to the right, as viewed in Fig. 15, about the pivots 308 and 310, thereby releasing the lug 301 of the collar 183 from engagement with the lug 300 of the armature 304. The spring 177 thereupon winds itself about the drum 173 to clutch the shaft 48 to the constantly rotating sprocket gear 136. Immediately thereafter, the spring 96 returns the armature 304 to its normal illustrated position, toward the left, as viewed in Fig. 15, to restore the lug 300 to its normal position, in the path of travel of the rotating lug 301 of the collar 183. The lug 301 of the collar 183 becomes reengaged by the lug 300, therefore, after a complete revolution of the clutched shaft 48.

If the papers 2 have been fed on to the table 91, as above described, they will become stacked thereon with their said unfolded edges 7 leading. It is desirable so to stack the papers 2 in the stack 89, however, that each group of ten, or any other desired number, of papers shall have the unfolded edges 7 reversed; that is, for example, so that the lowermost ten papers in the stack 89 shall have their end and side folded edges facing north and east, respectively, the next ten papers shall have those edges facing south and west, respectively, the next ten, north and east again, etc. Alternating the papers in this manner is desirable for some purposes, such as to facilitate their being counted by the persons receiving them, and also to make a more stable stack, with the upper papers thereof more or less level.

This result may readily be affected by turning the table 91 through 180 degrees upon the completion of the feeding and stacking of every group of ten or any other desired number of papers 2. Any desired number of groups of ten, twenty-five, fifty, etc. papers may thus be stacked on the table 91, with semi-rotations of the table 91 between the stacking of the successive groups. It is during these semi-rotations of the table 91 that the table 12 is raised to prevent further feeding of the papers 2 out of the hopper 339 by the conveyor 9. Before each semi-rotation of the table 91, the guide members 55 are raised, from their normal effective positions, up to ineffective positions, above the stack of papers 89; and after each semi-rotation of the table 91, the guide members 55 are relowered to their normal effective positions.

The table 91 is turned by rotating a vertically disposed shaft 95 upon which it is mounted. Half-rotations of the shaft 95 are effected, in timed relation to the operations above described, by means of a rack 431 that meshes with a gear 432 secured to the shaft 95. The rack 431 is provided upon a horizontally disposed bar 430 that is slidably actuated horizontally, first to the right, and then to the left, as viewed in Figs. 1, 10, 35 and 38, in guides 608. The slidable actuation of the bar 430 is effected by means of a crank pin 429 disposed in a slot 609 provided at one end of the bar 430. The crank pin 429 is mounted upon a gear 4 secured to the shaft 428. The shaft 428 is driven by a gear 86 on the shaft 84 that is controlled by the electromagnetic coils 82. The gearing is so designed that, corresponding to a half-revolution of the shaft 428, the shaft 95 shall be turned through a half-revolution; and when the shaft 428 is turned a further half-revolution to its original position, the shaft 95 shall likewise be turned a further half-revolution to its original position. These half-revolutions are effected at the end of the feeding of the papers 2 in groups of ten, or any other desired number. The driving connections will be described hereinafter.

To effect the raising and lowering of the guide members 55, they are rendered pivotaly movable upward in substantialy vertical planes, about a pivot 248, in opposition to the action of the spring 419. This may be effected in any desired manner, as by moving a vertically disposed link 443 toward the right, as viewed in Figs. 1 and 35, into engagement with a pin 437 mounted upon an arm 249 that is fixed to the arm 41. The link 443 is maintained always parallel to itself by a link 449 and a bell-crank lever 444 to both of which it is pivoted. The bell-crank lever 444 is actuated by means of a link 445 from a crank pin 447 on a gear 451. The gear 451 is driven by a gear 50 on the shaft 48, as ilustrated more particularly in Figs. 1, 5, 6, 35 and 38. The gear 451 is of diameter twice that of the gear 50, in order that it may be actuated through a half-revolution corresponding to each complete revolution of the gear 50 on the shaft 48.

In the course of one complete revolution of the shaft 48, after the table 12 has been raised to stop the feed out of the hopper 339, the link 443 is actuated upward and to the right, as viewed in Figs. 1 and 35. This results in swinging the guide members 55 upward, about the pivot 248, away from the stack 89, into their ineffective positions, illustrated in Fig. 35. The pin 437 is covered with friction material, such as rubber or leather, the frictional binding of which against the link 443 prevents the elevator assembly from dropping while the guide members 55 are raised above the topmost paper in the stack 89. During the time that the guide members 55 are raised, the table 91 and the stack 89 thereon are turned a half-revolution, after which the shaft 48 is rotated through another revolution, to return the link 443 from the position of Fig. 35 to the position of Fig. 1, thus restoring the guide members 55 to their normal effective positions. The table 12 is then relowered, to permit resuming the feed of the papers out of the hopper 339 by the conveyor 9. upon the feed becoming resumed, the papers will, this time, however, become stacked on the stack 89 in reversed position, with the said forward unfolded edges 7 of the papers 2 disposed oppositely on the stack 89 to the forward edges 7 of the prior-fed papers.

These operations, commencing with the raising of the guide members 55, are synchronized by the master switch 378, in the course of one complete revolution thereof, brought about by clutching the shaft 528 to the constantly rotating gear 195. In the course of this complete revolution, the master switch 378 is caused to engage successively contact members 568, 570, 572 and 574. When the master switch 378 engages the contact member 568 (Figs. 17, 29, 32 and 38 to 40), the guide members 55 become raised. When it engages the contact member 570, the table 91 is turned through a half-revolution. The guide members 58 are relowered to their normal position when the master switch 378 engages the contact member 572. And the shaft 170 is restored to its original position, thus relowering the cams 105 to permit the table 12 to become relowered from its effective to its ineffective position, when the master switch 378 engages the contact member 574.

These operations are effected by suitable electric connections. The contact members 568 and 572 are connected together by a conductor 571 that is connected, in turn, to a conductor 573 that leads, by way of a conductor 72, to the coils 43 for actuating the shaft 48 to raise and lower the guide members 55. The contact member 570 is similarly connected, by a conductor 515, to the coils 82 for actuating the shaft 84 to turn the table 91 through half-revolutions. The contact member 574 is connected, by a conductor 576, to the electromagnetic coils 316 for lowering of the table 12 to restart the feeding of the papers 2 out of the hopper 339. The engagement between the master switch 378 and the contact members 568, 570, 572 and 574 need be but momentary. As soon as the master switch 378 moves out of engagement with contact members 568 and 572, respectively, for example, the coils 43 become deenergized, and the spring 96 returns the armature 304 to its normal position.

At the end of the counting of the predetermined number of papers desired to be stacked for any particular dealer, and their accumulation in the stack 89, the stack 89 is removed from the table 91. To this end, the table 91 is shown constituted of a frame comprising parallel horizontally disposed slats 52 alternating in position with the positions of similarly disposed elongated rolls 523 mounted on shafts 44. Four rolls 523 may be provided but, as shown more particularly in Figs. 6 and 9, three will suffice the fourth roll 250 being shown as an idler. The rolls 523 are continuously rotated from a continuously driven shaft 425 by belts 426 engaging over pulleys 33 on the shaft 425 and pulleys 424 on the shafts 44 of the rolls 523. The mechanism for driving the shaft 425 will be hereinafter described.

The table 91 is raised and lowered by effecting successive half-revolutions of a cam 99 on a shaft 80 in response to actuation of the clutch controlled by the electromagnetic coils 75 for actuating the shaft 77 (Figs. 1, 5, 7, 9 and 10). A gear 78 on the shaft 77 drives a gear 79 on the shaft 80. The diameter of the gear 78 is half that of the gear 79, in order that the cam 99 shall be actuated through successive half-revolutions in response to complete revolutions of the shaft 77. A cam follower 427 disposed at the lower end of the table shaft 95 follows the cam 99 downward in engagement therewith, carrying the table 91 with it. A further half-revolution of the shaft 80 results in restoring the cam 99 and, therefore, the table 91, to their normal positions. The face of the gear 432 is wide enough so as to remain in mesh with the rack 431 both when the table 91 is in its uppermost and its lowermost positions.

To effect removal of the stack of sheets, the table 91 is lowered below the continuously rotating rolls 523, with its slats 52 into the spaces between these rolls. The lowering of the table 91 effects the lowering of the stack 89 of papers 2 into contact with the rolls 523. The stack 89 becomes thereupon moved by the rolls 523 off the table 91 and on to a downwardly inclined table 604 (Figs. 1, 6 and 8) at the side of the machine. A freely movable, horizontally disposed anti-friction roll 137 projecting upward through an opening 138 of the table 604 near the rolls 523 facilitates the travel of the stack 89 down the inclined table 604. A suitably marked and addressed wrapper may be previously deposited on the table 604, on which thus to deliver the stack 89 of papers. The inclination of the table 604 may be pivotally adjusted about a pivot 97 (Fig. 8) and fixed in adjusted position by a telescopically adjustable link 98.

The lowering and the raising of the table 91, and correlated raising and lowering of the guide members 55, are controlled by the master switch 30. When the shaft 628 becomes clutched to the constantly rotating sprocket gear 197 (Fig.

24), under the control of the reset push-button 294, as hereinafter more fully described, the master switch 30 is rotated through a complete revolution to engage successively contact members 368, 370, 372 and 374 (Figs. 18, 29, 32 and 38 to 40). When in engagement with the contact member 368, the master switch 30 effects the raising of the guide members 55, and when in engagement with the contact member 370, the lowering of the table 91, to effect successively the raising of the guide members 55, and a lowering of the table 91 to remove the stack 89 of papers thereupon. When in engagement with the contact member 372, the master switch 30 effects a restoration of the table 91 to its raised position, and when in engagement with the contact member 374, the relowering of the guide members 55. As for the electric connections, the contact members 368 and 374 are connected together, by a conductor 371, to a conductor 71, that is connected by the conductor 72 to the coils 43; and the contact members 370 and 372 are connected together, by a conductor 73, to a conductor 104 that is connected to the coils 75. The engagement of the master switch 30 with the respective contact members 368, 370, 372 and 374 need be but momentary, the same as the engagement of the master switch 378 with the contact members 568, 570, 572 and 574.

The master switches 378 and 30 normally occupy positions between the contact members 574 and 568, and 374 and 368, respectively, to which positions they are carried at the end of their cycles of operation.

The commutating discs 213 and 217 of the selector are both constituted of insulating material, and are respectively provided with tubular projections 287 and 288, as illustrated more particularly in Figs. 20 and 22 to 26 (the showing of Figs. 38 to 40 is more diagrammatic), that extend oppositely to each other into a conducting sleeve 251. The discs 213 and 217 are respectively further provided with centrally disposed conducting annuli 250 and 252, that are disposed opposite to each other in electrical contact with the ends of the conducting sleeve 251, the parts being joined together into a unitary spool by screws 286. This spool is disposed between the walls 221 and 303, and the counting shaft 220 extends through the insulating tubular projections 287 and 288 thereof, so as to be insulated from the conducting sleeve 251 and the conducting annuli 250 and 252. A roll 632 that is in continuous engagement with the annulus 252, as shown more particularly in Figs. 18 and 28, serves as a brush contact member. The counting shaft 220 engages frictionally against the interior walls of the tubular projections tightly enough to transmit the step-by-step rotary movement of the counting shaft 220 to the spool. This frictional engagement is loose enough, however, to permit rotatable adjustment of the spool about the shaft 220 to its initial position upon the completion of the stacking of each stack of papers 89 on the table 91. As hereinafter described, this return of the spool to its initial position is effected in response to manipulation of the reset push-button 294. The spool is thus rotated step by step, from the constantly rotating sprocket gear 198, under the control of the ratchet wheel 210 and the escapement pawl 208, but is reset periodically to its initial position before the commencement of the stacking of each new stack 89.

The commutating disc 213 constitutes a units-counter control, and the commutating disc 217 constitutes a tens-counter control. The disc 213 may, therefore, be referred to as the units disc and the disc 217 as the tens disc. It will now be explained how these discs control the circuits of the electromagnetic coils 316, 318, 43, 75, 82 and 36 and the consequent operation of the respective shafts 170, 48, 77, 84 and 528, so as to actuate the cams 105 for controlling the position of the table 12 and the feed of the papers out of the hopper 339, the raising and lowering of the guide members 55, the turning and the lowering and raising of the table 91, and the actuation of the master switch 378.

The units commutating disc 213 is associated with an assemblage constituted of a group of nine substantially equally spaced segmental contact members 624, electrically connected to the centrally disposed annulus 250. The segmental contact members 624 are marked in Figs. 22 and 32 with the nine units numbers 0, 1, 2, 3, 4, 5, 6, 7 and 8. As the said spool is rotated with the shaft 220, step by step, as before described, these segmental contact members 624 will cooperatively engage successively an assemblage constituted of a group of ten substantially equally spaced units contact members 215 circumferentially associated with the disc 213. They are marked, in Figs. 32 and 38, with the ten units numbers 0, 1, 2, 3, 4, 5, 6, 7, 8 and 9, respectively. The contact members 215 are respectively connected by wire conductors, as shown in Fig. 38, and, as hereinafter described, with the set of ten units push-button switches 606, corresponding to the ten units numbers 0, 1, 2, 3, 4, 5, 6, 7, 8 and 9, and correspondingly marked in Figs. 6 and 38. Corresponding openings 152 in a plate 151 into which they extend are similarly marked in Fig. 19. The two relatively actuable assemblages of contact members 624 and 215 both extend over substantially the same distance, along the circumference of the units commutating disc 213. Any number of these units push-button switches 606 may, of course, be employed, cooperating with a correspondingly designed units commutating disc 213.

Because there are ten units contact members 215, and only nine cooperating segmental contact members 624, they may be so disposed that, as the shaft 220 is rotated, step by step, by the constantly driven sprocket gear 198, the contact members 215 shall engage singly and successively the segmental contact members 624. The spacing of the contact members 624 and 215 is so related to the step-by-step actuation of the shaft 220 and the commutating disc 213 driven thereby that one contact member 215 always engages one and one only of the segmental contact members 624.

The order in which the segmental contact members 624 engage the contact members 215 will now be described in connection with Fig. 32. It should be noted that, in this Fig. 32, the disc 213 is shown from the side opposite to that shown in Fig. 38. It will be assumed that the shaft 220 is rotated past the contact members 215 anti-clockwise, as viewed in Fig. 32 (or clockwise, as viewed in Fig. 38).

In the first or initial position of the units commutating disc 213, the first segmental contact member 624, marked 0, is alone shown in Fig. 32 engaging the first contact member 215, which is also marked 0. At the end of one count, the first segmental contact member 624 marked 0 will have been moved anti-clockwise, as viewed in Fig. 32, out of engagement with the contact member 215 marked 0, and the second segmental contact member 624, marked 1, will have been moved anti-clockwise into engagement with the second contact member 215, marked 1, which will alone, at this time, engage a segmental contact member 624. At the end of two counts, the second segmental contact member 624, marked 1, will have been moved anti-clockwise out of engagement with the second contact member 215 marked 1, and the third segmental contact member 624, marked 2, will have been moved anti-clockwise into engagement with the third contact member 215, marked 2, which will alone, at this time, engage a segmental contact member 624. At the end of three counts, the fourth segmental contact member 624, marked 3, will alone engage a contact member 215, which will be the fourth, marked 3. The fifth, sixth, seventh, eighth and ninth segmental contact members 624, respectively marked 4, 5, 6, 7 and 8, will, similarly, singly and successively, alone engage the fifth, sixth, seventh, eighth and ninth contact members 215, respectively marked 4, 5, 6, 7 and 8. In the course of the first eight step-by-step actuations of the counting shaft 228, corresponding to the first eight counts of the counting ratchet wheel 218, therefore, the eight segmental contact members 624 marked 1 to 8, will, in that order, successively and singly engage the successively disposed eight contact members 215 marked 1 to 8. At the ninth count, the ninth segmental contact member 624, marked 8, will have been moved anti-clockwise out of engagement with the ninth contact member 215, marked 8, and the first segmental contact member 624, marked 0, will have been moved into engagement with the tenth contact member 215, marked 9. At the tenth count, the first segmental contact member 624, marked 0, will have been moved anti-clockwise out of engagement with the tenth contact member 215, marked 9, and the second segmental contact member 624, marked 1, will have been moved anti-clockwise into engagement with the first contact member 215, marked 0, which will alone, at this time, engage a segmental contact member 624. The position will then be the same as shown in Fig. 32, except that the second segmental contact member 624, marked 1, will now be in engagement with the first contact member 215, marked 0; and this will again be the only segmental contact member 624 in engagement with any contact member 215.

During these first ten step-by-step actuations of the shaft 228, therefore, the commutating disc 213 will have been actuated through an angular distance corresponding to that between two successive segmental contact members 624. The operation is obviously similar to that of a vernier.

During the next nine step-by-step actuations of the shaft 228, the operation above described will be repeated. The segmental contact members 624, marked 2, 3, 4, 5, 6, 7, 8, 0, 1, will successively and singly engage the contact members 215 marked 1, 2, 3, 4, 5, 6, 7, 8, 9. At the twentieth count, the segmental contact member marked 2 will be moved into engagement with the first contact member 215 marked 0.

During the next ten counts, this operation will again be repeated, until the fourth segmental contact member 624, marked 3, will be moved into engagement with the first contact member 215, marked 0.

At the fortieth count, the fifth segmental contact member 624, marked 4, will be moved into engagement with the first contact member 215 marked 0; at the fiftieth count, the sixth segmental contact member 624, marked 5, will be moved into engagement with the first contact member 215 marked 0; etc. At the eightieth count, if the operation were to proceed that far, the ninth segmental contact member 624, marked 8, would be moved into engagement with the first contact member 215, marked 0.

With the arrangement illustrated, and with only eight tens push-button switches 606, as also illustrated, it is not possible to count to any greater number because of the action of the lugs 285 and 622 (Figs. 20 and 43), the function of which, as hereinafter described, is to reset the commutating discs 213 and 217 and the spool of which they constitute a part. The apparatus can, however, easily be adapted to the counting of any desired number of papers 2 stacked, and other means than the lugs 285 and 622 can be provided for resetting the commutating disc spool. It can even be reset by hand.

The tens commutating disc 217 is provided with but a single segmental contact member 14, electrically connected to the centrally disposed annulus 252 and, therefore, through the sleeve 251, to the annulus 250 and the group of segmental contact members 624. During the step-by-step rotation of the before-mentioned sleeve by the counter shaft 226, the contact member 14 will be rotated in synchronism with the segmental contact members 624 successively to engage cooperatively a group of any desired number, usually ten, of substantially equally spaced tens or other multiple contact members 219 circumferentially associated with the disc 217. The contact members 14 and 219, like the contact members 624 and 215, may be regarded as constituting two relatively actuable assemblages, one of the assemblages comprising only the single contact member 14.

The contact members 215 and 219 are shown in the form of rolls, each freely movable pivotally, as shown more particularly in Fig. 27, about a pin at one end of an arm 230, the other end of which is pivoted about a pivot member 231 that extends through the wall 221 or 303. The arms 230 are spring-pressed, each by means of a spring 232, so as to provide yielding engagement between the contact rolls 215 and 219 and the peripheries of the discs 213 and 217, respectively. Firm contact is thus obtained between the contact members 215 and 219 and their corresponding commutating discs 213 and 217, with a minimum of friction.

The provision of ten units contact members 215 and ten tens contact members 219 will provide for counting up to one hundred papers. Additional sets of ten contact members each will usually be provided to enable counting to hundreds, thousands, etc., thus to provide for the counting and stacking of any number of papers 2.

For simplicity, however, only eight contact members 219 are illustrated, respectively connected by wire conductors, as shown in Fig. 38, and as hereinafter described, with the set of eight tens push-button switches 602.

The tens push-button switches 602 are marked in Figs. 6 and 38 with the tens numbers 0, 10, 20, 30, 40, 50, 60 and 70, respectively. Corresponding openings 153 in the plate 151 into which they extend are similarly marked in Fig. 19. Corresponding markings are placed opposite to the contact members 219 of Fig. 28, and upon the disc 217 in Fig. 38. In Fig. 38, the tens push-button switches 602 are shown positioned in reverse order to the actual positions on the machine, as shown in Figs. 6 and 19, in order to simplify the showing of the circuit connections. In cooperation with the assemblages of contact members 215 and 219, and the assemblages of contact members 624 and 14, the set of tens push-button switches 602 controls the total tens, and the set of units push-button switches 606 the total units, of the total count, and together they control the total number, of the papers accumulated in the stack 89. With this arrangement, as stated, therefore, by suitable combinations of the tens push-button switches 602 and the units push-button switches 606, it is possible to count and accumulate in the stack 89 up to eighty papers.

The contact member 14 is just large enough so that one end of it becomes actuated into engagement with one of the contact members 219 when its other end is actuated out of engagement with the next-preceding contact member 219. Initially, the tens commutating disc 217 occupies a position such that the contact member 14 engages the contact member 219 marked 0, as illustrated in Fig. 28. In the course of the first ten step-by-step actuations of the counter shaft 220, while the successive segmental contact members 624 engage successively the successively positioned contact members 215, as before described, the contact member 14 will remain in engagement with only that one contact member 219, marked 0 in Fig. 28. At the eleventh count, when the segmental contact member 624 marked 2 engages the contact member 215 marked 1, as before described, the contact member 14 will be actuated from the contact member 219 marked 0 to the next contact member 219, marked 10. In the course of the next ten step-by-step actuations of the shaft 220, during which the successive segmental contact members 624 will again engage successively the successively positioned contact members 215, as before described, the contact member 14 will remain in engagement with the one contact member 219 marked 10. During the next ten step-by-step actuations of the shaft 220, the contact member 14 will similarly remain in engagement with the third contact member 219, marked 20; and so on. In all cases, the contact member 14 remains in engagement with one contact member 219 only throughout the ten step-by-step actuations of the counter shaft 220 corresponding to the ten single and successive engagements of the contact members 215 and 624, before moving into engagement with the next contact member 219.

The push-button switches 602 and 606 extend through openings in the fixed cover plate 201 of the housing 93 and also through the openings 151 and 152 alined therewith in the pivoted plate 151 therebelow. They are normally maintained raised in suitable jacks; the units switches 606 in jacks 610 and the tens switches 602 in jacks 612. One of the arms of each jack 610 is connected to a conductor 626, and the other arms are connected by hereinafter-described wire conductors to the respective contact members 215. One of the arms of each jack 612 is similarly connected to a conductor 145, and the other arms by hereinafter-described wire conductors to the respective contact members 219.

In their raised positions, as illustrated more particularly in Figs. 28 and 29, the units push-button switches 606 are normally insulated from their respective jacks 610, so as to be normally ineffective, and the tens switches 602 are normally effective, so as cooperatively to establish electrical contact with their respective jacks 612. The push-button switches may, however, be depressed to their lowered positions, in which the units switches 606 become cooperatively effective to establish electrical contact with their respective jacks 612, and the tens switches 602 become ineffective, so as to break connection with their respective jacks 612. To this end, the units switches 606 are provided with upper conducting sleeves or collars 54 and lower insulating sleeves or collars 53 and the tens switches 602 are provided with upper insulating sleeves or collars 106 and with lower conducting sleeves or collars 107. In its raised position, therefore, each units switch 606 prevents any flow of current between the arms of its jack 610 because of the insulating collar or sleeve 53 interposed between them; in its lowered position, however, each units switch 606 bridges the arms of the jack 610 through the medium of the conducting collar 54. Each tens switch 602, on the other hand, in its raised position, bridges the arms of its jack 612 to establish electrical contact between them; and, in its lowered position, each tens switch 602 insulates the arms of these jacks 612, by means of the insulating sleeves 106, to prevent the flow of current between them.

By reason of this arrangement, as will hereinafter appear, one of the units push-button switches 606 in its lowered position, and all except one of the tens push-button switches 602, in their raised positions, control the stacking of a corresponding number of papers.

If, for purposes of illustration, it may be assumed that it is desired to stack sixty-five papers, the units push-button switch 606 marked 5 and the tens push-button switch 602 marked 60 will both be depressed in their respective jacks 610 and 612, the remaining push-button switches 602 and 606 remaining raised. The depressed push-button switches will control suitable electric circuits for effecting the feeding out of the hopper 339 and the counting of the desired number of papers and their stacking on the table 91; in this case, sixty-five.

The reset push-button 294 is disposed above one end of a lever 149 that is fixed to a shaft 148 so as to extend to the left thereof, as viewed in Fig. 29. Upon the reset push-button 294 becoming depressed, the lever 149 will be pivotally actuated counter-clockwise, as viewed in Figs. 28 and 29, effecting a corresponding rocking movement of the shaft 148 in bearings 260. Two levers 150 and 262 are secured to the shaft 148 so as to extend to the right thereof, as viewed in Figs. 28 and 29, in a direction opposite to the direction of extension of the lever 149, as shown more particularly in Fig. 19. Rods 264 and 266 that are secured to the underside of the plate 151 are rockably mounted in bearings in the respective levers 150 and 262. The rocking movement of the shaft 148 transmitted thereto by the reset push-button 294 will, therefore, be communicated to the levers 150 and 262 and, from them, to the plate 151. The plate 151 will thereupon become raised upward, causing the walls of the openings 152 and 153 to be actuated into engagement with collars 155 provided upon the push-button switches 602 and 606 to raise these push-button switches up into their original undepressed positions.

Two further levers 205 and 268 are secured to the shaft 148. The lever 268 is connected by a link 169 to a forked arm 171 that is pivoted at 266. The lever 205 is connected by a link 155 to a forked member 157 that is intermediately pivoted about a horizontally disposed rod 158, as illustrated more particularly in Figs. 18 and 29. The rod 158 is held in a plate 295 (Figs. 18 and 42) that is mounted on the frame of the housing 93, and a sleeve 296 that is integral with the lever 157 is mounted to turn freely thereon. Actuation of the lever 149 by the reset push-button 294 will thus rock the shaft 148 pivotally to actuate these links 155 and 169. The arm 171 and the arms 270 of the forked member 157 are provided with lugs 300, similar to the lugs 300 before described.

The lugs 300 of the arm 171 cooperate with a lug 301, similar to the lug 301 before described, on a cylindrical housing 331. The housing 331 is secured to the collar 168 that is fixed to the shaft 628 of the master switch 30 by the screw 56, as illustrated more particularly in Fig. 24. The coiled spring 177 is wound about a drum 174, similar to the drum 173, and is adapted to become tightened to clutch the shaft 628 to the constantly rotating gear 197. The gear 197 is fixed by one of the screws 56 to a sleeve 291 that is mounted loosely about the shaft 628. The end 179 of the spring 177 is held in the hole 192 of the collar 168 and the other end 181 is held in the hole 191 of the collar 183, that is free to rotate about the sleeve 291. When either lug 300 of the forked arm 171 is engaged by the lug 301 of the housing 331, therefore, the spring 177 will be unclutched from the drum 174, and the sleeve 291 will alone be constantly driven by the sprocket gear 197.

The normal position of the parts is illustrated in Fig. 28. Upon the depression of the reset push-button 294, the link 169 will actuate the forked member 171 out of its normal position, releasing the lug 301 of the forked arm 171 from engagement with the right-hand lug 300 of the housing 331, and actuating the left-hand lug into the path of rotation of the lug 301. The spring 177 will thereupon clutch the collars 183 and 168 and the shaft 628 of the master switch 30 to the constantly rotating sleeve 291, until this lug 301 becomes engaged by the left-hand lug 300 of the housing 331, at the end of a half-revolution. Upon the release of the push-button 294, the forked arm 171 and its lugs 300 will become restored, by gravity, to their normal positions, completing the revolution of the shaft 628. During the time that the reset push-button 294 is depressed, the master switch 30 will engage, in succession, the contact members 368 and 370 to effect the raising of the guide member 55 and the lowering of the table 91, to remove the stack 89 by means of the rolls 523. Upon the release of the push-button 294, the master switch 30 will successively engage also the contact members 372 and 374 to restore the table 91 to its raised position and to relower the guide members 55 to their original positions.

The lugs 300 on the arms 270 of the forked member 157 cooperate with a lug 301 on a cylindrical housing 159, mounted upon a shaft 206 that is alined with, and loosely connected to, the shaft 220, as shown more particularly in Figs. 20 and 29. A drum 161 and a spring 162 inside the housing 159 cooperate in the same way as the drum 173 and the spring 177. The upper lug 300 of the forked member 157 is actuated out of engagement with the lug 301 of the housing 159 by depression of the reset push-button 294 (Fig. 20). A sprocket gear 207 is fixed to the shaft 206 by one of the screws 56, so as to be constantly rotated thereby. The sprocket gear 207, in turn, is actuated by a sprocket chain 163 that is driven from a sprocket wheel 290 on the shaft 188 (Fig. 42). The drum 161 is fixed to the shaft 206 by a pin 272, so as also to be constantly rotated.

One end of the spring 162 is held in an opening (not shown) in a collar 274 that is free to turn about the shaft 206, in the same way that the end 181 of the spring 177 is held in the opening 191 (Fig. 12). The other end of the spring 162 is held similarly in an opening 279 in an annular plate 276 that is held to the housing 159 by a screw 278. The housing 159 is secured to the collar 274 by a screw 297. When, upon the push-button 294 becoming depressed, the lug 301 of the housing 159 becomes released from its engagement with the upper lug 300 (Fig. 29) of the forked member 157, therefore, the spring 162 will wind itself tightly about the drum 161 to cause the housing 159 to be rotated with the constantly rotating shaft 206.

The housing 159 will carry with it, in its rotation, a sleeve 280 that is keyed to the housing 159 at 282. The sleeve 280 is keyed also, at 283, to the collared sleeve 284. The collar of the sleeve 284 is provided with the lug 622 for engaging the lug 285 on the disc 213, as illustrated more particularly in Figs. 20 and 43. The spool that carries the discs 213 and 217 is thus caused, by the engagement of the lugs 622 and 285, to be rotated from the continuously rotating sprocket gear 207 about the shaft 220. Upon the return of the reset push-button 294 to its upper position, to permit the parts to resume their normal position by gravity, the lug 301 on the housing 159 will be restored into engagement with the upper lug 300 (as viewed in Fig. 29) of the forked member 157. The spool will then have been rotated by the lugs 622 and 285 to a position such that the selector discs 213 and 217 will be restored to their initial or zero positions, illustrated in Figs. 32 and 28, respectively.

The electric system is normally ineffective to energize the clutch-controlling coils 315, 318, 43, 83, 75 and 36. It is rendered effective by manually depressing selectively the proper push-button switches 602 and 606 and operating the machine through a cycle or group of cycles of operation. The necessary circuits will be rendered effective, in sequence, at the end of predetermined rotative movement of the counting wheel 218, as determined by the counting finger 13, and as controlled by the contact members 624 and 14 of the respective commutating discs 213 and 217.

The wiring connections will be understood from Figs. 38 to 40. The first or 0 contact member 215 of the commutator disc 213 is connected by a conductor 413 with the jack 610 of the first or 0 units push-button switch 606. The second or 1 contact member 215 is connected by a conductor 415 with the jack 610 of the second or 1 units push-button switch 606. The third or 2 contact member 215 is connected by a conductor 417 with the third or 2 units push-button switch 606; and so on. The sixth or 5 contact member, for example, is connected by a conductor 69 with the jack 610 of the sixth or 5 push-button switch 606; and the last or 9 contact member 215 is connected by a conductor 419 with the jack 610 of the last or 9 units push-button switch 606.

The first or 0 contact member 219 of the commutating disc 217 is similarly connected by a conductor 427 with the jack 612 of the first tens push-button switch 602, marked 0; the second or 10 contact member 219 is connected by a conductor 311 with the jack 612 of the second contact member 602, marked 10;—the sixth or 50 contact member 219 is similarly connected by a conductor 425 with the sixth or 50 tens push-button switch 602; the seventh or 60 contact member 219 by a conductor 423 with the seventh or 60 push-button switch 606; and the last or 70 contact member 219 by a conductor 421 with the last or 70 push-button switch 606.

Though the spool on which the commutating discs 213 and 217 are mounted is rotatably actuated by the shaft 220, so that the respective segmental contact members 624 shall engage successively their respective cooperating contact members 215 and the contact member 14 shall engage the necessary contact members 219, respectively, circuits for effecting the desired operations are not completely established, notwithstanding the engagement of these contact members, except when the corresponding units and tens push-button switches 606 and 602 have been depressed. By connecting the sixth units push-button switch 606 marked 5, for example, so as to connect it, through its conducting sleeve 54, with its corresponding sixth contact member 215, a circuit will be established between this sixth units push-button switch 606 and the corresponding contact segment 624, at the end of five counts.

A motor 8 for driving the machine may be connected to power-supply mains 61 and 430 of alternating current by means of a line switch 293 (Figs. 1, 5, 6, 7 and 38 to 40). A pulley 15 on the shaft of the motor 8 drives pulleys 251 and 252 by means of a belt 112. The pulley 251 drives the shaft of the pulley or roll 74. The pulley 252 is mounted on the shaft 253 of the pulley 32. The belts 3 and 9 are thus driven by the constantly rotating pulleys 74 and 32, respectively, through the medium of the constantly driven pulleys 251 and 252. On the shaft 253 of the pulley 32 there is mounted also a sprocket gear 113 (shown more particularly in Figs. 5 and 6) over which passes a sprocket chain 114, which drives sprocket gears 115, 116 and 117.

The sprocket gear 116 is mounted on the shaft 254 of the pulley 59 and, therefore, supplies power for the belts 21. It supplies power also for the belts 17 through the medium of a gear 118 mounted upon the shaft 255 of the pulley 57, and meshing with a gear 119 on the shaft 254 of the pulley 59. The sprocket gear 115 is mounted on a shaft 133 on which is mounted a sprocket gear 134 for driving a sprocket chain 135 (shown more particularly in Figs. 5 and 6) that passes over the sprocket gears 175 and 136. The sprocket gears 175 and 136, as before explained, are thus continuously driven to drive the respective shafts 170 and 48 intermittently when they become clutched thereto.

The gear 117 is mounted on a shaft 120 on which is mounted also a sprocket gear 121 for driving a sprocket chain 122 that passes over a sprocket gear 123 on the shaft 425. Power is thus continuously supplied to the shaft 425 for continuously driving the rolls 523. The shaft 425 is provided with a small sprocket gear 124 over which is mounted a sprocket chain 126 (shown clearly in Figs. 5, 7, 9 and 31) that drives a sprocket gear 256 on a shaft 127. Power is thus constantly supplied to the shaft 127 from the shaft 425 which, as before described, is actuated by the sprocket chain 122. A sprocket gear 128 on the shaft 127 drives a sprocket chain 130 for driving the sprocket gear 132 on the shaft 77 and the sprocket gear 257 on the shaft 84.

Upon the shaft 127 there is mounted a sprocket gear 189 over which passes a sprocket chain 190 for driving a sprocket gear 187 mounted upon the shaft 188, as illustrated more particularly in Figs. 9 and 28. Power is supplied to the counter-and-selector mechanism from the shaft 188, which extends through the housing 93 to support the sprocket gears 192 and 200. The sprocket gear 192 actuates a sprocket chain 193 that passes over, to drive constantly, the three sprocket gears 195, 197 and 198 for respectively actuating, in the manner before described, the shaft 528 of the master switch 378, the shaft 628 of the master switch 39, and the shaft 247 for yieldingly driving the counter shaft 220 through the friction-clutch disc 229. The sprocket gear 200 drives the sprocket gear 207 on the shaft 206.

The power-supply mains 61 and 430 are also connected by the line switch 293 to a rectifier-and-filter 379 (Figs. 8 and 38 to 40). The circuit to the rectifier-and-filter 379 extends, on one side, as shown in Figs. 38 to 40, from the main 61, through the line switch 293, and by way of a conductor 62; and, on the other side, from the main 430, through the switch 293, by way of a conductor 63. One side of the rectifier-and-filter 379 is connected to a ground 614, and the other side to the conductor 26. All the hereinafter-mentioned grounds are connected to the ground 614. The ground 614 constitutes one side, and the conductor 26 the other side, of a source of rectified-and-filtered non-pulsating direct current for energizing all the hereinafter described circuits of the before-described electromagnetic coils, and also the circuit of a high-resistance neon signal lamp 116.

It will be assumed that the machine is at rest. The master switches occupy their normal illustrated positions, the master switch 378 between the contact members 574 and 568, and the master switch 39 between the contact members 374 and 368. The table 12 has previously, at the end of the prior cycle of operations, been raised by the cams 105 on the shaft 178 to its normal effective position, above the conveyor 9, closing up the space under the projecting finger 16 of the wall 11, and raising the papers in the hopper 338 above the conveyor 9, so that the machine can not feed any papers 2 out of the hopper 338.

The cam 160 on the shaft 178 occupies, at this time, its normal position, shown in Fig. 3, in engagement with the two-way leaf spring 13, so that the contact members 22 and 24 are in engagement, and the contact members 67 and 19 are out of engagement. The various armatures 300 occupy positions such that their lugs 399 are engaged by the lugs 301 of the collars 103, so that the corresponding collars 168 are unclutched from the drums 173. This is illustrated, for example, as before explained, in Figs. 11 and 13. The shaft 206 for effecting the resetting of the discs 213 and 217, under the control of the reset push-button 294, likewise occupies its normal position.

Let it be assumed, as before, that the units push-button switch 606 marked 5, and the tens push-button switch 602 marked 60, have been depressed, as illustrated in Fig. 38, so as to count and stack 65 sheets, the remaining push-button switches 606 and 602 being maintained in their raised positions. The closing of the line switch 293 will connect the motor 8 and the rectifier-and-filter 379 to the power-supply mains 61 and 430. The motor 8 will set the belt conveyors 3 and 9 into operation through the belt 112. The conveyor 3 will effect the feeding into the hopper 339 of as many papers 2 as can pass under the wall 5, but the raised table 12 prevents feeding of the papers by the belts 9 out of the hopper 339. The sprocket gears 175, 136, 132 and 257 are set into continuous rotation by the sprocket chains 114, 135, 122, 126 and 130, to drive continuously the drums 173 of the shafts 170, 48, 77 and 84 to which they are respectively secured. As the shafts 170, 48, 77 and 84 are not, at this time, clutched to the respective drums 173, however, they are maintained stationary. The cams 105 of the shaft 170 remain raised, therefore, to hold the table 12 in its raised, effective position.

The machine may now be started into operation by depressing the start push-button switch 10. A circuit becomes then established to effect the lowering of the table 12. This circuit may be traced in Figs. 38 to 40 from the conductor 26, through the two-way leaf spring 20 and the contact members 22 and 24, that are normally maintained closed by this leaf spring 20, and by way of the conductor 29 and conductors 28, 428 and 139, to the start push-button switch 10. The circuit continues from the start push-button switch 10, by way of conductors 64 and 65, to the lower electromagnetic coils 316, and from these coils 316, to a ground 66.

The closing of this circuit of the lower coils 316 will cause them to become energized to actuate the lower armature 304 toward the right, and the upper armature 302 toward the left, into the positions illustrated in Fig. 12. The lug 301 on the collar 186 will thus become freed from its engagement, illustrated in Figs. 11 and 12, with the lug 300 of the lower armature 304. The spring 177 will, therefore, clutch the collar 168, and the shaft 170 to which it is secured, to the constantly rotating drum 173. The shaft 170, with the cams 105 and 160 carried thereby, will thus become actuated through an initial half-revolution only, as before described. The resulting lowering of the cams 105 permits lowering of the table 12 to its ineffective position, about its pivot 125, by gravity, thereby lowering the papers 2 in the hopper 339 into engagement with the continuously traveling belts 9. The resultant raising of the cam 160 effects raising of the contact member 67 into engagement with the contact member 19, at the same time raising the contact member 22 out of engagement with the contact member 24. The breaking of the engagement of the contact members 22 and 24 effects the opening of the above-described circuit of the electromagnetic coils 316 for effecting the lowering of the table 12. The closing of the contact members 19 and 67 effects the closing of two circuits. One of these circuits, through the contact members 164 and 166, at the successive moments when the latter become closed by the raising of the counting arm 13, includes the counter-controlling electromagnetic coils 202. The other circuit leads to the push-button switches 602 and 606 and the selector commutating discs 213 and 217.

Upon the table 12 becoming lowered, the belts 9 begin to feed the papers 2 out of the hopper 339, through the gap between them and the finger 16 of the wall 11, and under the counting finger 13. As the papers 2 pass successively under this counting finger 13, they successively actuate it, to effect the closing of the contact members 164 and 166. This circuit of the counter electromagnetic coils 202 may be traced from the conductor 26, through the leaf spring 20, the contact members 19 and 67 which, at this time, are held closed by the cam 160, by way of conductors 25 and 209, through the leaf spring 194, the contact members 164 and 166, and the leaf spring 196, and by way of the conductor 204, to the counter electromagnetic coils 202; and from the coils 202, to a ground 68. The successive closing and opening of this circuit of the coils 202 by the counting finger 13, as before explained, results in step-by-step rotatable actuation of the counting wheel 218, the counter shaft 220 to which it is secured, and the counter 224 and the commutating discs 213, 217 of the selector.

The contact members 67 and 19 control not only the circuit of the counter-controlling electromagnetic coils 202, but also, as before stated, the circuit to the push-button switches 606 and 602. The last-named circuit extends from the conductor 26 through the leaf spring 20 and the switches 19 and 67, to the conductor 25; and from the conductor 25, by way of a conductor 630, to the conductor 626. The circuit can not be traced further from the conductor 626 through the arms of the jacks 610 unless one of the units switch buttons 606 has been depressed.

The circuit can not, for example, be traced by way of the conductor 413 to the contact member 215 marked 0, which is initially engaged with the segmental contact member 624 marked 0, because the first push-button switch 606, marked 0, is open. The same is true as to the next four segmental contact members 624, which become actuated, singly and successively, into engagement with the next succeeding contact members 215, at the end of the next four additional counts, as before described, since their corresponding units push-button switches 606 are raised, as shown in Fig. 38. The units push-button switch 606 marked 5 alone being assumed to have been depressed, the other units push-button switches 606 being raised, as illustrated in Figs. 38 to 40, the contact member 215 marked 5 is exclusively effective, in cooperation with the units disc 213, to control the number of papers that shall be accumulated on the table 91 before the next-following operation. A similar remark applies, of course, to the contact members 219 of the disc 217 and the tens push-button switches 602.

After five step-by-step actuations of the counting shaft 220, the commutating disc 213 will have become actuated thereby, step by step, to its sixth position, in which contact will be made between the sixth contact member 215, marked 5, and the sixth segmental contact member 624, marked 5. A group of five papers, the number predetermined by the units push-button switch 606 marked 5, will have become counted and accumulated in the stack 89 upon the table 91. Before any more papers 2 will be stacked on the table 91, the circuit of the electromagnetic coils 318 will become closed, to effect actuation of the shaft 170 through a half-revolution, in order that the cams 105 may raise the table 12, thereby to close the gap between the finger 16 of the wall 11 and the belts 9, thus to stop the feed of the papers 2 out of the hopper 339. The circuit of the said coils 318 continues from the units push-button switch 606 marked 5 and the arms of the jack 610 bridged thereby and, by way of the conductor 69, to the sixth contact member 215 marked 5. This push-button switch connection only is shown, for simplicity, in Figs. 39 and 40.

From the sixth contact member 215 marked 5, the circuit continues through the sixth segmental contact member 624, marked 5, which is in engagement therewith at this time, to the annulus 250 (Fig. 20); and, from the annulus 250, to the sleeve 251. The circuit continues from the roll 632, in engagement with the annulus 252, by way of conductors 143 and 620 (Figs. 38 to 40) to the electromagnetic coils 318; and from the coils 318 to a ground 580.

The coils 318 become thereupon energized to actuate the upper armature 302 to the right, as viewed in Fig. 12, thereby releasing its lug 300 from engagement with the lug 301 of the collar 183. The spring 177 thereupon binds against the shaft 170 to clutch the constantly rotating drum 173, thereby to effect a half-revolution only of the shaft 170 and the cams 105 and 160 carried thereby, as before described. This half-revolution of the shaft 170 results in raising the cams 105 to raise the table 12, thus closing the gap under the finger 16 and stopping the feed of the papers out of the hopper 339. The cam 160, at the same time, becomes lowered through a half-revolution to release the leaf spring 18, effecting the breaking of the engagement of the contact members 67 and 19, and the reengagement of the contact members 22 and 24. The breaking of the engagement of the contact members 67 and 19 effects the opening of the above-described circuit to the counterelectromagnetic coils 202 and the circuit to the push-button switches 606 and 602, the commutator discs 213 and 217 and the coils 318. The reengagement of the contact members 22 and 24 makes possible, at the proper time, the reestablishment of the circuit of the electromagnetic coils 316, for effecting the relowering of the table 12 and the starting anew of the feeding of the papers out of the hopper 339.

Immediately after the feed has been stopped by lifting the table 12, following upon the stacking on the table 91 of the first group of five papers 2, the guide members 55 will be raised, the table 91 will then be turned a half-revolution, and the guide members 55 will be relowered, after which the table 12 will become relowered, to permit the stacking on the table 91 of ten more papers, making fifteen papers in all. This is effected by means of the master switch 378, which, as before stated, is rotated through a complete revolution by the action of the shaft 528, through its becoming clutched to the constantly rotating sprocket gear 195 (Fig. 24) upon energization of the electromagnetic coils 36.

The circuit of these coils 36 was established simultaneously with the establishment of the above-described circuit of the table-controlling electromagnetic coils, and before contact was broken between the contact members 67 and 19. This circuit may be traced as a branch circuit extending from the conducting sleeve 251 to the conducting annulus 252 (Fig. 20) and the contact member 14 of the disc 217 connected therewith. The contact member 14, as before explained, is at this time in contact with the first contact member 219, marked 0. The circuit continues by way of the conductor 427, the first tens push-button switch 606, marked 0, which has not been depressed, and the arms of the jack 612 thereof, by way of conductors 145 and 38, to the electromagnetic coils 36; and from these electromagnetic coils 36 to a ground 35. The electromagnetic coils 36 thereupon become energized to actuate the armature 304 (Figs. 17 and 24), thereby releasing the lug 301 of the collar 183 from its engagement with the lug 300 of the armature 304. The corresponding spring 177 thereupon clutches the shaft 528 of the master switch 378 to the constantly rotating sprocket gear 195 to actuate the master switch 378 throughout a complete revolution. Before the end of this complete revolution, the above-described circuit of the coils 36 having meantime become broken by the contact members 67 and 19, the armature 304 will have become restored to its original position by the spring 96, so that its lug 300 will become reengaged by the lug 301 of the collar 183, preventing more than the one revolution of the shaft 528 and the master switch 378 controlled thereby.

During this complete revolution of the master switch 378, it will first make contact with the contact member 568. A circuit will thereupon be established from the conductor 26, through the leaf spring 20 and the contact members 22 and 24, which have become closed by the cam 160 simultaneously with the lowering of the cams 105, and by way of conductors 26, 29 and 428, to the master switch 378. The circuit continues from the master switch 378, through the contact member 568, and by way of the conductors 571 and 573, to the electromagnetic coils 43; and from the electromagnetic coils 43 to a ground 42. The consequent energization of the electromagnetic coil 43 effects the actuation of the armature 304, shown in Figs. 15 and 16. The lug 300 of this armature 304 becomes moved over to the right, as viewed in Figs. 15 and 34, releasing the lug 301 on the collar 183, and permitting the spring 177 to bind tightly against the drum 173, thereby to effect clutching of the collar 183 to the collar 168. The shaft 48 becomes thereby rotated through a complete revolution, or until the lug 301 becomes reengaged by the lug 300 on the armature 304, which has become restored to its normal position by the spring 96. During this complete revolution, the gear 50 on the shaft 48 will rotate the gear 451 and the crank pin 447 mounted thereon through a half-revolution, to effect actuation of the link 443 through the links 445, 444 and 449. The guide members 55 will thus become raised pivotally above the top of the stack, 89, about the pivot 248, to the position shown in Fig. 35.

When the master switch 378 becomes actuated into contact with the contact member 570, a circuit becomes established from the master switch 378, through this contact member 570, by way of the conductor 575, to the electromagnetic coils 82; and from the electromagnetic coils 82 to a ground 83. The circuit of the electromagnetic coils 82 becoming thus closed, the coils will become energized to effect rotation of the shaft 84 through a complete revolution, in the same manner as before described. During this complete revolution, the gear 86 will rotate the gear 4 through a half-revolution. The crank pin 429 on the gear 4 will thus become actuated through a half-revolution, thereby effecting an actuation of the rack 431 to drive the gear 432 and the shaft 95 on which it is mounted through a half revolution. This will result in turning of the table 91 and the stack 89 thereon through a half-revolution.

Meantime, the master switch 378 has been moved out of contact with the contact member 570, and into contact with the contact member 572. A circuit becomes then established from the master switch 378, through the contact member 572 and, by way of the conductor 573, again, to the coils 43. At the time of the breaking of the contact between the master switch 378 and the contact member 568, the spring 96 of Fig. 15 returned the armature 304 to its original position. Upon this reclosing of the circuit of the coils 43, the armature 304 of Figs. 15 and 16 becomes again attracted to the right, as viewed in Figs. 15 and 34, thereby again releasing the lug 301 of the collar 183 from engagement with the lug 300 of the armature 304, and permitting a further revolution of the collar 183, and a consequent further rotation of the shaft 48. The gear 50 thereupon drives the gear 451 back to its original position, permitting the guide members 55 to become restored from the position illustrated in Fig. 35 to that illustrated in Figs. 1 and 7.

In its next position, the master switch 378 makes contact with the contact member 574. A circuit is then established from the master switch 378, through the contact member 574, and, by way of the conductor 576, through the coils 316, to the ground 66. The consequent energization of the coils 316 will effect a rotation of the shaft 170 through a further half-revolution, in the same manner as before described, to effect the lowering of the table 12 by the cams 105 to its ineffective position, permitting the recommencing of the feeding of the papers 2 out of the hopper 339 and, through the cam 160, the reopening of the contact members 22 and 24 and the reclosing of the contact members 19 and 67.

The table 91, with the stack 89 of five sheets thereon, has now been rotated through a half-revolution, while the guide members 55 were raised, and the guide members 55 have been restored to their normal position. With the table 12 relowered, the machine again commences to feed the papers 2 out of the hopper 339 and on to the stack 89. The closing of the contact members 19 and 67 by the shaft 100 has reestablished the circuit of the counter-controlling electromagnetic coils 202, and also the circuit to the push-button switches 606 and 602 and the commutating discs 213 and 217. The electromagnetic coils 202, therefore, will resume control, through the pawl 208, of the step-by-step actuation of the shaft 220.

During the feeding of the first group of five papers before described, the conducting segment 14 of the disc 217 has remained in contact with the first contact member 219, marked 0. The circuit to the commutating discs 213 and 217 can not, therefore, be reestablished through the units push-button switches 601 marked 6, 7, 8, 9, 0, 1, 2, 3, 4, in sequence, because these are all open. During the feeding and stacking of ten further papers 2, corresponding to these ten units push-button switches 606 in this sequence, but in a position reverse to that of the original stack of the first five papers, the shaft 220 will be actuated ten steps, corresponding to ten counts, as controlled by ten further operations of the pawl 208. The actuation of the before-described sleeve and the discs 213 and 217 mounted thereon may be regarded as in two steps: one step corresponding to the feeding of the first five papers of the next group of ten papers; and the other step corresponding to the feeding of the second five papers of this group of ten. The contact segment 14 remains in contact with the same first contact member 219, marked 0, during the feeding of the first five papers of this next group of ten papers; and in contact with the next-succeeding contact member 219, marked 10, during the feeding of the remaining five papers of this second group of ten papers.

During the feeding of this further group of ten papers, the contact segments 624 will singly and successively become actuated into engagement with their corresponding contact members 215, as before described. The first nine of these actuations will correspond to the open push-button switches 606 marked 6, 7, 8, 9, 0, 1, 2, 3, 4, to which these contact members 215 are connected. The tenth will correspond to the tenth push-button switch 606 marked 5.

At the tenth additional count, or fifteen counts in all, corresponding to the feeding and stacking of fifteen papers, therefore, the contact member 624 marked 5 will again become actuated into engagement with the contact member 215 marked 5, which is connected to the push-button switch 606 marked 5. Thereupon, two circuits will again become established through the commutating disc 213. One of these is through the brush-contact roll 632, which is always in contact with the annulus 252, and by way of the conductors 143 and 620, to the electromagnetic coils 318. The other may be traced from the contact member 14 and the second contact member 219, marked 10, in engagement therewith, by way of the conductor 311, through the second tens push-button switch 602, marked 10, and which has not been depressed, and by way of the conductors 145 and 38, to the electromagnetic coils 36.

The coils 318 will thereupon effect a reclosing of the gap under the finger 16 of the wall 11, to prevent further feeding of the papers 2 out of the hopper 339, and the coils 36 will effect a reactuation of the master switch 378, throughout a complete revolution, into engagement with the contact members 568, 570, 572 and 574. During this revolution of the master switch 378, the guide members 55 will again be raised, the table 91 will again be rotated through a half-revolution, the guide member 55 will again be relowered, and the coils 316 will again become energized to effect resumption of feeding of the papers out of the hopper 339, in the same manner as before described.

The feeding of the papers 2, recommenced at the end of the stacking of the first five papers, has continued until the discs 213 and 217 became rotated sufficiently to effect the stacking of a group of ten additional papers on the stacking table, but turned 180 degrees with respect to the said first group of five papers. The stack 89 on the table 91 will now contain fifteen papers, the lower group of five facing with their unfolded edges in one direction, and the next group of ten facing with their unfolded edges in the opposite direction. A further group of ten papers will now be stacked, with their edges in the same direction as those of the original five stacked papers. Upon the accumulation of these additional ten papers, making a total of twenty-five, the same operations will again take place.

In this manner, under the control of the selector commutating discs 213 and 217 and the contact members 67 and 19, which are closed when the table 12 is lowered, the cams 105 will be raised to lift the table 12, thereby to interrupt the feed of the papers out of the hopper 339, at the end of the feed of groups of 5, 15, 25, 35, 45, 55 and 65 papers. Under the control of the master switch 378, in cooperation with the switch members 22 and 24, between the feeding of successive groups of the papers, the guide members 55 will be raised, the table 91 with the stack 89 thereon will be turned a half-revolution, the guide members 55 will be relowered, and the table 12 will be relowered to recommence the feeding and stacking of the papers.

At the end of the feeding and stacking of the 65th paper in the stack 89, the contact member 14 will be in contact with the contact member 219 marked 60. The above-described circuit of the coils 318, through the sixth units push-button switch 606, and from the roll 612, and by way of the conductors 143 and 620, has, therefore, again been established, as before, to stop the feed of the papers out of the hopper 339. The circuit to the electromagnetic coils 36, for actuating the master switch 378, extending from the contact member 14, by way of the conductor 423, to the tens push-button switch 602 marked 60, will, this time, however, be open, because this tens push-button switch 602 marked 60 has been depressed, to insulate the arms of its corresponding jack 612.

There will not, therefore, be any further repetition of the operations before described of actuating the guide members 55 or turning the table 91. After 65 papers have thus become counted and stacked, the operation of the machine becomes terminated, with the stack 89 of 65 papers 2 on the table 91, at rest.

The operator has become notified of the completion of the stacking of the 65 sheets by the signal lamp 116, the circuit of which was established simultaneously with the final establishment of the circuit of the coils 318 and in parallel thereto. This circuit extends from the sleeve 251, by way of the conductor 143 and a conductor 258, through the signal lamp 116, by way of the conductor 38, and through the coils 36, to the ground 35.

If the tens push-button switch 606 marked 60 had not been depressed, it would have been possible to trace this circuit through the coils 36 through this push-button switch 60 in such manner as to short-circuit the signal lamp 116. The coils 36 would then have become sufficiently energized to actuate the shaft 528 of the master switch 378, as before described. The depressing of the tens push-button switch 606 marked 60 has now prevented the short-circuiting of the signal lamp 116. The signal lamp 116 will, therefore, be caused to flash. Because of the high resistance of the neon signal lamp 116, however, there will not be enough current through the electromagnetic coils 36 to actuate the shaft 528 of the master switch 378.

The illumination of the lamp 116 will constitute a signal to the operator that the stacking of the sixty-five papers has been completed. The operator will now depress the reset push-button 294 to remove the stack 89 of papers from the table 91. The shaft 628 will thereupon become clutched to the constantly rotating sprocket gear 197 (Fig. 24) to actuate the master switch 30 throughout a complete revolution.

In the first position of the master switch 30, since the leaf spring 20 has been restored to its original position, a circuit will be established from the conductor 26, through the leaf spring 20 and the contact members 22 and 24 and, by way of conductors 29 and 269, to the master switch 30; and from the master switch 30 to the contact member 368. The circuit continues, by way of the conductors 371, 71 and 72, to the electromagnetic coils 43 and the ground 42. The guide members 55 will therefore be raised, in the same way as before described, about the pivot 248.

When the master switch 30 engages the contact member 370, a circuit will be established from the master switch 30, through the contact member 370 and, by way of the conductor 104, to the electromagnetic coils 75. This will effect actuation, through a complete revolution, in the manner before described, of the shaft 77. A complete revolution of the shaft 77 will effect a half-revolution of the shaft 80 and the cam 99 mounted thereon. The half-revolution of the cam 99 will effect a lowering of the cam follower 427 and the shaft 95 and the table 91 mounted thereon, but without disengaging the gear 432 from the rack 431. Upon the lowering of the table 91, the stack 89 of papers becomes lowered into engagement with the rolls 523, which effect removal of the stack 89 of papers over the anti-friction roll 137 and on to the table 604.

In its next position, the master switch 30 engages the contact member 372, which is connected, by way of the conductor 73, to the same conductor 104, leading to the electromagnetic coils 75. The engagement of the master switch 30 with the contact member 372, therefore, effects a reclosing of the circuit of the coil 75 and a further complete revolution of the shaft 77, thereby effecting a further half-revolution of the shaft 80 and the cam 99 thereon, to effect a reraising of the table 91 to its original position. The interval between the lowering and raising of the table 91 is sufficient for the rolls 523 to perform their work of removing the stack of papers.

Upon the master switch 30 reaching the contact member 374, the circuit of the coils 43 becomes reestablished by way of the conductors 71 and 72 effecting the relowering of the guide members 55 to their original position. The depressing of the reset push-button 294 has effected also the return of the commutating discs 213 and 217 to their initial position, through the clutching of sleeve 284 to the constantly rotating shaft 206 (Fig. 20). As before explained, this is effected by the lug 622 on the sleeve 284 engaging the lug 285 (Fig. 43).

The depressing of the reset push-button 294 has further returned the depressed units push-button switch 606 and the depressed tens push-button switch 602 to their raised positions. The machine is now ready for the accumulation of a new stack 89 of papers on the table 91, the size of which is determined by the setting of two other push-button switches 606 and 602. As before described, the new stacking will be recommenced by operating the start push-button switch 10.

In the example given above, the stack 89 of sixty-five papers collected on the table 91, as determined by the units push-button switch marked 5 and the tens push-button switch marked 60, was constituted of one group of five papers and six groups each of ten papers, the table 91 having been turned through half-rotations during interruptions of the feed between each two successive groups. The number of papers in the first group may be varied or adjusted, as desired, from zero to nine, depending upon which unit push-button switch 606 has been manually depressed. The actuation of the units disc 213 from its initial position to a position corresponding to the depressed push-button switch 602 will determine, in all cases, the variable number of papers in the first group stacked.

If the units push-button switch 606 marked 0 had been depressed, the above-described circuit from the conductor 626 would, at the very beginning, have continued through the arms of its jack 619 directly to the segmental contact member 624 marked 0 and the cooperating contact member 215 marked 0; and then, through the conducting annulus 250, the sleeve 251 and the conducting annulus 252, directly to the segmental contact member 14 of the commutating disc 217. The machine would then have stacked a first group of ten papers, a second group of ten papers reversed in position to the first group, a third group of ten papers positioned in the same direction as the first group, and so on, up to a total of sixty papers.

It will further be observed that if the tens push-button switch 602 marked 0 had been depressed, it would not have been possible to trace the above-described circuit through this tens push-button switch 602. The machine would then have stopped operating at the end of the stacking of the first group of five papers, instead of continuing until sixty-five papers were accumulated. Depending upon which units push-button switch 606 is depressed, in combination with this tens push-button switch 606 marked 0, therefore, groups of papers 2, each less than ten in number, may be stacked on the table 91. The feed will be interrupted, at the end of the stacking of each of these groups, whereupon the table 91 may be lowered, as before described, by the master switch 30, to enable the rolls 523 to remove each group before the stacking of the next group. The same result may, of course, be obtained by omitting the tens push-button switches 602 and the commutating disc 217 connected therewith, and connecting the conductor 145 directly to the conducting sleeve 251.

On the other hand, when it is desired to count into hundreds, the eight tens push-button switches 602 will be increased to ten, and a third set of push-button switches will be provided, as before stated, together with a third commutating disc, corresponding to the disc 217, and a third arrangement of contact members corresponding to the contact members 219. The contact members of the third arrangement would be connected through the third set of push-button switches to the conductor 145, in the same way that the tens push-button switches 602 are shown connected to the conductor 145 in Fig. 38. If it is desired to count into the thousands, a fourth set of push-button switches and a fourth commutating disc like the disc 217 would be provided, and so on.

The feed of the papers 2 may be stopped at any time by depressing the stop push-button switch 172. A circuit is then established from the conductor 26, through the leaf spring 20, the contact members 19 and 67 and the leaf spring 18 and, by way of the conductors 25, 630 and 626, to the stop push-button switch 172, shunting the push-button switches 602 and 606, and the commutating discs 213 and 217. The circuit continues from the stop push-button switch 172, by way of a conductor 64 and the conductors 258 and 628, to the coils 318 and the ground 580. The coils 318 will thus become energized to actuate the shaft 170 through a half-revolution, thereby, through the cams 105, to raise the table 12 to stop the further feeding of the papers out of the hopper 339.

By maintaining the start-push-button switch 10 depressed, the above-described circuit of the electromagnetic coils 318 controlled thereby will be maintained continuously closed. In this manner, the papers may be caused to feed continuously through the machine, without the aid of the selector, until either the stop push-button switch 10 is raised, to enable the depressed push-button switches 602 and 606 to assume control, or until the hopper 339 becomes entirely emptied. This is an advantage when it is desired merely to count the papers to any number, at will.

Modifications will occur to persons skilled in the art, and all such are considered to fall within the spirit and scope of the invention, as defined in the appended claims.

What is claimed is:

1. Apparatus of the character described comprising means for conveying articles, means for controlling the number of articles conveyed, and means comprising a plurality of manually adjustable units elements and a plurality of manually adjustable multiple elements for manually adjusting the controlling means to predetermine the number of articles conveyed.

2. Apparatus of the character described comprising means for collecting articles, means for controlling the number of articles collected, and means comprising a plurality of manually adjustable units elements and a plurality of manually adjustable multiple elements for manually adjusting the controlling means to predetermine the number of articles collected.

3. Apparatus of the character described comprising means for conveying articles and for collecting the conveyed articles, means for controlling the number of articles conveyed and collected, and means comprising a plurality of manually adjustable units elements and a plurality of manually adjustable multiple elements for manually adjusting the controlling means to predetermine the number of articles conveyed and collected.

4. Apparatus of the character described comprising a conveyor for conveying articles, means for controlling the number of articles conveyed, means for manually adjusting the controlling means to predetermine the number of articles conveyed, and means for preventing the conveyor from further conveying the articles after the predetermined number of articles has been conveyed.

5. Apparatus of the character described comprising means for collecting articles, means for controlling the number of articles collected, means for manually adjusting the controlling means to predetermine the number of articles collected, and means for preventing further collection of the articles after the predetermined number of articles has been collected.

6. Apparatus of the character described comprising means for feeding sheets, a counter for counting the sheets, means controlled by the counter for rendering the feeding means ineffective at the end of the feeding of a predetermined number of the sheets, and manually controllable means for varying the predetermined number.

7. Apparatus of the character described comprising means for stacking sheets, a counter for counting the sheets, means controlled by the counter for rendering the stacking means ineffective at the end of the stacking of a predetermined number of the sheets, and manually controllable means for varying the predetermined number.

8. Apparatus of the character described comprising means for conveying sheets, means for counting the sheets, a selector, means for manually adjusting the selector to predetermine the number of sheets conveyed, and means controlled by the counting means and cooperative with the selector to terminate the conveying of the sheets after the predetermined number of sheets has been conveyed.

9. Apparatus of the character described comprising means for stacking sheets, means for counting the sheets, a selector, means for manually adjusting the selector to predetermine the number of sheets stacked, and means comprising a plurality of manually adjustable units elements and a plurality of manually adjustable multiple elements controlled by the counting means and cooperative with the selector to terminate the stacking after the predetermined number of sheets has been stacked.

10. Apparatus of the character described comprising means for conveying sheets, means for controlling the number of sheets conveyed, and a plurality of manually operable switches for adjusting the controlling means to predetermine the number of sheets conveyed.

11. Apparatus of the character described comprising means for stacking sheets, means for controlling the number of sheets stacked, and a plurality of manually operable switches for adjusting the controlling means to predetermine the number of sheets stacked.

12. Apparatus of the character described comprising means for conveying sheets and for stacking the conveyed sheets, means for controlling the number of sheets conveyed and stacked, and a plurality of manually operable switches for adjusting the controlling means to predetermine the number of sheets conveyed and stacked.

13. Apparatus of the character described comprising means for conveying sheets, a selector for controlling the number of sheets conveyed, a plurality of controlling elements permanently connected with the selector and manually adjustable to predetermine the number of sheets conveyed, and means controlled by the selector as controlled by the manually adjusted elements for conveying the number of sheets predetermined by the elements.

14. Apparatus of the character described comprising means for stacking sheets, a selector for controlling the number of sheets stacked, a plurality of controlling elements permanently connected with the selector and manually adjustable to predetermine the numbers of sheets stacked, and means controlled by the selector as controlled by the manually adjusted elements for stacking the numbers of sheets predetermined by the elements.

15. Apparatus of the character described comprising means for conveying sheets and for stacking the conveyed sheets, a selector for controlling the number of sheets conveyed and stacked, a plurality of controlling elements permanently connected with the selector and manually adjustable to predetermine the numbers of sheets conveyed and stacked, and means controlled by the selector as controlled by the manually adjusted elements for conveying and stacking the numbers of sheets predetermined by the elements.

16. Apparatus of the character described comprising means for collecting articles, means comprising a plurality of manually adjustable units elements and a plurality of manually adjustable multiple elements for manually controlling the number of articles collected, and means for moving the collected articles as a unit.

17. Apparatus of the character described comprising means for collecting articles, means for moving the collected articles as a unit when a predetermined number of the articles has been collected, switch means for controlling the moving means, and means for manually adjusting the switch means to vary the predetermined number.

18. Apparatus of the character described comprising means for stacking sheets, means comprising a plurality of manually adjustable units elements and a plurality of manually adjustable multiple elements for manually controlling the number of sheets stacked, and means for moving the stacked sheets as a unit.

19. Apparatus of the character described comprising means for conveying sheets, means for stacking the conveyed sheets, means comprising a plurality of manually adjustable units elements and a plurality of manually adjustable multiple elements for manually controlling the number of sheets stacked, and means for moving the stacked sheets as a unit.

20. Apparatus of the character described comprising a hopper for receiving a plurality of sheets, a conveyor for conveying the sheets out of the hopper, means for counting the conveyed sheets, means for stacking the conveyed sheets, means for manually controlling the number of sheets stacked, and means controlled by the counting means for moving the stacked sheets as a unit.

21. Apparatus of the character described comprising a support, means for feeding sheets to the support to stack them, a second support positioned to one side of the first-named support, means for moving the stacked sheets as a unit from the first-named support to the second support when a predetermined number of the sheets has been stacked on the first-named support, and means comprising a plurality of manually adjustable units elements and a plurality of manually adjustable multiple elements for manually varying the predetermined number.

22. Apparatus of the character described comprising a support, means for feeding articles to the support, means for moving the support after a predetermined number of articles has been fed to the support, and means comprising a plurality of manually adjustable units elements and a plurality of manually adjustable multiple elements for varying the predetermined number.

23. Apparatus of the character described comprising a support, means for feeding articles to the support, means for moving the support after a predetermined number of articles has been fed to the support, and means comprising a plurality of manually adjustable units elements and a plurality of manually adjustable multiple elements for manually varying the predetermined number.

24. Apparatus of the character described comprising a table, means for feeding sheets to the table, means controlled by the feeding means for turning the table after a predetermined number of sheets has been fed thereto, and means comprising a plurality of manually adjustable units elements and a plurality of manually adjustable multiple elements for varying the predetermined number.

25. Apparatus of the character described comprising a table on which sheets may be stacked, means for stacking sheets on the table, means controlled by the stacking means for turning the table after the stacking thereon of a predetermined number of the sheets, and means comprising a plurality of manually adjustable units elements and a plurality of manually adjustable multiple elements for varying the predetermined number.

26. Apparatus of the character described comprising means for conveying articles, a counter for counting the articles conveyed, switch means controlled by the counter, normally ineffective switch means for cooperating with the counter controlled switch means, and means for manually rendering the normally ineffective switch means effective to predetermine the number of articles conveyed at the end of a corresponding count of the counter.

27. A machine of the character described comprising a support, means for collecting articles on the support in groups, means for moving the support after the collection thereon of each group of articles, and means comprising a plurality of manually adjustable units elements and a plurality of manually adjustable multiple elements for manually varying the size of the groups.

28. A machine of the character described comprising a support, means for feeding sheets to the support, means for controlling the feeding means to cause the feeding means to feed the sheets to the support in groups, means for interrupting the feed of the sheets to the support at the completion of the feeding thereto of each group of sheets, and means comprising a plurality of manually adjustable units elements and a plurality of manually adjustable multiple elements for manually varying the size of the groups.

29. A machine of the character described comprising a support, means for collecting articles on the support in groups, means for moving the support after the collection thereon of successive groups of articles, and means comprising a plurality of manually adjustable units elements and a plurality of manually adjustable multiple elements for manually varying the size of one of the groups.

30. A machine of the character described comprising a support, means for feeding sheets to the support, means for controlling the feeding means to cause the feeding means to feed the sheets to the support in groups, means for interrupting the feed of the sheets to the support at the completion of the feeding thereto of each group of sheets, and means for manually varying the size of one of the groups.

31. A machine of the character described comprising a support, means for feeding sheets to the support, means for controlling the feeding means to cause the feeding means to feed the sheets to the support in groups, means for fixing the size of a plurality of the groups at a predetermined number, and means for manually adjusting the size of one of the groups.

32. A machine of the character described comprising a support, means for stacking sheets on the support in groups of sheets, means for moving the support after the stacking thereon of successive groups of the sheets, and means comprising a plurality of manually adjustable units elements and a plurality of manually adjustable multiple elements for manually varying the size of one of the groups.

33. A machine of the character described comprising a support, means for stacking sheets on the support in groups of sheets, means for turning the support after the stacking thereon of successive groups of the sheets, a controlling member, and means comprising a plurality of manually adjustable units elements and a plurality of manually adjustable multiple elements for controlling the controlling member to vary the size of one of the groups.

34. A machine of the character described comprising a support, means for stacking sheets on the support in groups of sheets, means for turning the support after the stacking thereon of successive groups of the sheets, a rotatable controlling member, and means comprising a plurality of manually adjustable units elements and a plurality of manually adjustable multiple elements for adjusting the degree of rotation of the controlling member to adjust the size of one of the groups.

35. A machine of the character described comprising a support, means for stacking sheets on the support in groups of sheets, manually controllable means for controlling the size of one of the groups, and manually controllable means for controlling the size of other groups.

36. A machine of the character described comprising a support, means for stacking sheets on the support in groups of sheets, and a plurality of controlling elements for respectively controlling the size of one of the groups, each member corresponding to a different size.

37. Apparatus of the character described for feeding sheets in groups all the groups of which, except one group, shall have the same number of sheets, the said machine comprising means for feeding the sheets, means for rendering the feeding means ineffective at the end of the feeding of each of the said groups of sheets and, after the feeding of each group of sheets except the last group, to render the feeding means effective to feed the next-following group of sheets, and means for varying the number of sheets in the said one group.

38. Apparatus of the character described for feeding sheets in groups all the groups of which, except one group, shall have the same number of sheets, the said machine comprising means for feeding the sheets, a counter for counting the sheets, means controlled by the counter for rendering the feeding means ineffective at the end of the feeding of each of the said groups of sheets and, after the feeding of each group of sheets except the last group, to render the feeding means effective to feed the next-following group of sheets, and means for varying the number of sheets in the said one group.

39. A machine of the character described comprising a support, means for stacking sheets on the support in groups of sheets, a controlling member, means for actuating the controlling member from an initial position to a variable second position to control the size of one of the groups, a plurality of controlling elements, and means controlled by any of the controlling elements to control the said variable second position, thereby to control the size of the said one group.

40. A machine of the character described comprising a support, means for stacking sheets on the support in groups of sheets, means for interrupting the stacking of the sheets on the support at the completion of the stacking of each group, the interrupting means comprising an electric circuit, a controlling member and a plurality of manually controllable contact members, means for actuating the controlling member step by step from an initial position toward a second position, one step corresponding to each sheet of one of the groups stacked on the support, and means controlled by any of the contact members and cooperating with the controlling member to vary the size of the said one group.

41. A machine of the character described comprising a support, means for stacking sheets on the support in groups of sheets, means for moving the support after the stacking thereon of each group of sheets, means for removing the sheets from the support after the stacking thereon of a predetermined number of groups of sheets, and means for manually varying the predetermined number of sheets in one of the groups.

42. A machine of the character described comprising a support, means for stacking sheets on the support in groups of sheets, a plurality of controlling elements each adapted to occupy an effective position and an ineffective position and each corresponding to a predetermined number of sheets in one of the groups, and means controlled in accordance with the effective position of any of the controlling elements to control the size of the said one group.

43. A machine of the character described comprising a support, means for stacking sheets on the support in groups of sheets, a controlling member, means for actuating the controlling member from an initial position to a variable second position corresponding to a variable predetermined number of groups of sheets, and means controlled by the controlling member in the second position to control the stacking on the support of that predetermined number of groups that corresponds to the said second variable position occupied by the controlling member.

44. A machine of the character described comprising a support, means for stacking sheets on the support in groups of sheets, a plurality of controlling elements, each corresponding to a predetermined number of groups of sheets, and means controlled by any of the controlling elements to control the stacking on the support of that predetermined number of groups that corresponds to the said controlling element.

45. A machine of the character described comprising a support, means for stacking sheets on the support in groups of sheets, an electric circuit, a controlling member, a plurality of manually controllable contact members, means for actuating the controlling member step by step from an initial position toward a second position, one step corresponding to each group stacked on the support, and means controlled by any of the contact members and cooperating with the controlling member to control the stacking on the support of that predetermined number of groups that corresponds to the said contact member.

46. A machine of the character described comprising a support, means for stacking sheets on the support in groups of sheets, two sets of controlling elements, the controlling elements of one of the sets each corresponding to a predetermined number of groups of sheets, the controlling elements of the other set each corresponding to a variable number of sheets in one of the groups, means controlled by any of the controlling elements of the said one set to control the stacking on the support of that predetermined number of groups that corresponds to the said controlling element, and means controlled by any of the controlling elements of the said other set to control the size of one of the groups.

47. A machine of the character described comprising a support, means for stacking sheets on the support in groups of sheets, means for turning the support after the stacking thereon of each group of sheets, a plurality of controlling elements, each corresponding to a predetermined number of groups of sheets, and means controlled by one of the controlling elements to prevent both further turning of the support and further stacking of sheets on the support after the stacking on the support of that predetermined number of groups that corresponds to the said controlling element.

48. A machine of the character described comprising a support, means for stacking sheets on the support in groups of sheets, an electric circuit, a controlling contact member, a plurality of manually controllable contact members, means for actuating the controlling contact member step by step from an initial position toward a second position, one step corresponding to each group stacked on the support, means connecting the controlling contact member into circuit with the controllable contact members to effect turning of the support upon the stacking of each group on the support, and means controlled by any of the controllable contact members and cooperating with the controlling contact member for preventing the further turning of the support upon the stacking upon the support of that predetermined number of groups that corresponds to the said controllable contact member.

49. A machine of the character described comprising means for feeding sheets, a rotatable counting wheel, means controlled by the sheets as they are fed for actuating the counting wheel, two contact discs rotatable with the counting wheel, two sets of contact members, one for each contact disc, and each adapted to occupy an effective position and an ineffective position, the contact members of one of the sets each corresponding to a predetermined number of groups of sheets, a support, means controlled by any of the contact members of one of the sets and cooperating with its contact disc for controlling the feeding to the support of that predetermined number of groups of sheets corresponding to the predetermined number of the said contact member, and means controlled by any of the contact members of the other set for varying the size of one of the groups.

50. Apparatus of the character described comprising a counter, a normally ineffective electric system, a plurality of manually actuable contact members, and means operable at the end of a predetermined count of the counter and cooperative with the manually actuable contact member to render the electric system effective.

51. Apparatus of the character described comprising means for feeding sheets, a counter for counting the sheets, an electric system for controlling the feeding means, a plurality of manually actuable contact members, and means operable at the end of a predetermined count of the counter as determined by the manually actuable contact members for rendering the electric system effective to render the feeding means ineffective at the end of the feeding of a predetermined number of the sheets.

52. Apparatus of the character described comprising means for feeding sheets, an electric system for controlling the feeding means, a units controlling element, a multiple controlling element, means controlled by the units controlling element for actuating the multiple controlling element at the end of a predetermined operation of the units controlling element, an electric system, a plurality of manually actuable contact members cooperative with the units controlling element, a second plurality of manually actuable contact members cooperative with the multiple controlling element, and means controlled by the controlling elements as controlled by the manually actuable contact members for rendering the electric system effective to render the feeding means ineffective at the end of the feeding of a predetermined number of the sheets.

53. A machine of the character described comprising a support, means for feeding sheets to the support successively to form groups of sheets, means normally positioned in the line of feed of the sheets for guiding the sheets to the support, means for rendering the feeding means ineffective, thereby to stop the feeding of the sheets, at the end of the feeding of each group of sheets, a plurality of controlling elements each corresponding to a predetermined number of groups of sheets, and means controlled by any of the controlling elements and operable at the end of the feeding of each group of sheets to move the guiding means out of the line of feed, turn the support, return the guiding means to its normal position in the line of feed, and render the feeding means again effective.

54. A machine of the character described comprising a support, means for feeding sheets to the support successively to form groups of sheets, means for rendering the feeding means ineffective, thereby to stop the feeding of the sheet, at the end of the feeding of each group of sheets, means thereupon operable, except at the end of the feeding of a predetermined group of sheets, to turn the support and then render the feeding means again effective, means manually controllable at the end of the feeding of the said predetermined group of sheets to remove the sheets from the support, and means for thereafter rendering the feeding means again effective.

55. A machine of the character described comprising a support normally occupying a predetermined position, means for feeding sheets to the support successively to form groups of sheets, means normally positioned in the line of feed of the sheets for guiding the sheets to the support, means for rendering the feeding means ineffective, thereby to stop the feeding of the sheets, at the end of the feeding of each group of sheets, means thereupon operable, except at the end of the feeding of a predetermined group of sheets, to move the guiding means out of the line of feed, turn the support, return the guiding means to its normal position in the line of feed, and then render the feeding means again effective, and means manually controllable at the end of the feeding of said predetermined group of sheets to move the guiding means out of the line of feed, move the support out of the said predetermined position to permit removal of the sheets therefrom, restore the support to its said predetermined position, and restore the guiding means to its normal position in the line of feed.

56. A machine of the character described comprising a support, means for feeding sheets to the support successively to form groups of sheets, means for rendering the feeding means ineffective, thereby to stop the feeding of the sheets, at the end of the feeding of each group of sheets, a plurality of controlling elements each adapted to occupy an effective position and an ineffective position, a selector adapted normally to occupy an initial position, means controlled in accordance with the feeding of the sheets for actuating the selector out of the initial position, means controlled in accordance with the effective position of any of the controlling elements and the position of the selector to control the size of one of the groups, and means for actuating the controlling elements to their ineffective position and the selector to the initial position.

57. A machine of the character described comprising a support normally occupying a predetermined position, means for feeding sheets to the support successively to form groups of sheets, means for rendering the feeding means ineffective, thereby to stop the feeding of the sheets, at the end of the feeding of each group of sheets, a plurality of controlling elements, means controlled by any of the controlling elements to control the size of one of the groups, means for actuating the support out of the predetermined position, returning it to the predetermined position and actuating the controlling elements to their ineffective position, and means operative upon the actuation of the support out of the predetermined position to remove the sheets from the support.

58. A machine of the character described comprising a support, means for stacking sheets on the support in groups of sheets, a plurality of controlling elements each adapted to occupy two positions and each corresponding to a predetermined number of groups of sheets, a selector adapted to occupy an initial position, means controlled in accordance with the feeding of the sheets for actuating the selector to a second position, and means controlled by any of the controlling elements in one of the said two positions and the selector in the said second position to control the stacking on the support of that predetermined number of groups that corresponds to the said controlling element, and means for actuating the controlling elements to the other of their said two positions and the selector to its initial position.

59. A machine of the character described comprising a support normally occupying a predetermined position, means for feeding sheets to the support successively to form groups of sheets, means for rendering the feeding means ineffective, thereby to stop the feeding of the sheets, at the end of the feeding of each group of sheets, a plurality of controlling elements each adapted to occupy two positions, means controlled by any of the controlling elements in one of the said two positions to control the size of one of the groups, means for actuating the support out of the predetermined position, returning it to the predetermined position and actuating the controlling elements to the other of their said two positions, and means operative upon the actuation of the support out of the predetermined position to remove the sheets from the support.

60. A machine of the character described comprising a support, means for stacking sheets on the support in groups of sheets, means for moving the support after the stacking thereon of each group of sheets, and means for indicating the stacking of a predetermined number of sheets on the support.

61. A machine of the character described comprising a support, means for feeding sheets to the support, means for controlling the feeding means to cause the feeding means to feed the sheets to the support in groups, means for interrupting the feed of the sheets to the support at the completion of the feeding thereto of each group of sheets, and means for stopping the feed of the sheets at any time manually.

62. Apparatus of the character described comprising a counter, a normally ineffective electric system, a plurality of contact members manually operable selectively, and means operable at the end of a predetermined count of the counter and cooperative with the manually selectively operable contact members for rendering the electric system effective.

63. Apparatus of the character described comprising a normally ineffective electric system, a movable counting member, contact means movable therewith, a plurality of contact members adapted to cooperate with the contact means during the movement of the movable counting member, a plurality of contact members manually operable selectively, one connected to each of the first-named plurality of contact members, and means operable at the end of a predetermined movement of the counting member as determined by the manually selectively operable contact members for rendering the electric system effective.

64. Apparatus of the character described comprising means for feeding a plurality of groups of sheets all the groups of which, except one group, shall have the same number of sheets, a counter for counting the sheets, means controlled by the counter for rendering the feeding means ineffective at the end of the feeding of each group of sheets except a predetermined group and for thereafter rendering the feeding means effective to feed the next-following group of sheets, and means for rendering the feeding means ineffective to feed further sheets at the end of the feeding of the predetermined group of sheets.

65. A machine of the character described comprising a support, means for stacking sheets on the support in groups of sheets, means for turning the support after the stacking thereon of each group of sheets, a plurality of controlling elements, and means controlled by the controlling elements to prevent both further turning of the support and further stacking of sheets on the support after the stacking on the support of a predetermined number of sheets.

66. Apparatus of the character described comprising means for stacking a plurality of sheets, means for counting the sheets as they are stacked, a plurality of successively operable means controlled manually and by the counting means for controlling the number of sheets stacked, and means controlled by the manually controlled means for addressing the stacked sheets.

OTTO E. WOLFF.